United States Patent
Sun et al.

(10) Patent No.: US 11,828,516 B2
(45) Date of Patent: Nov. 28, 2023

(54) AUTOMATED CRYOGENIC STORAGE AND RETRIEVAL SYSTEM

(71) Applicant: Azenta US, Inc., Burlington, MA (US)

(72) Inventors: Lingchen Sun, Milford, MA (US); Bruce Zandi, Chelmsford, MA (US); Frank Hunt, Jr., Shrewsbury, MA (US); Aaron Plaisted, Chelmsford, MA (US); Tiffany Holmes, Chelmsford, MA (US); Matthew Albert, Hollis, NH (US); Fang Cui, Chelmsford, MA (US); Yuri Rubenchik, Chelmsford, MA (US); Daniel Lamothe, Chelmsford, MA (US)

(73) Assignee: AZENTA US, INC., Burlington, MA (US)

( * ) Notice: Subject to any disclaimer, the term of this patent is extended or adjusted under 35 U.S.C. 154(b) by 859 days.

(21) Appl. No.: 16/354,993

(22) Filed: Mar. 15, 2019

(65) Prior Publication Data
US 2019/0293344 A1     Sep. 26, 2019

Related U.S. Application Data

(60) Provisional application No. 62/647,450, filed on Mar. 23, 2018.

(51) Int. Cl.
*F25D 29/00*    (2006.01)
*G01N 35/00*    (2006.01)
(Continued)

(52) U.S. Cl.
CPC ......... *F25D 29/001* (2013.01); *A01N 1/0236* (2013.01); *A01N 1/0257* (2013.01);
(Continued)

(58) Field of Classification Search
None
See application file for complete search history.

(56) References Cited

U.S. PATENT DOCUMENTS

| 5,233,844 A | 8/1993 | Knippscheer et al. |
| 5,498,116 A | 3/1996 | Woodruff et al. |

(Continued)

FOREIGN PATENT DOCUMENTS

| JP | 2004075363 A | * | 3/2004 | ........... B65G 1/0435 |
| WO | 2012033605 A2 | | 3/2012 | |

(Continued)

OTHER PUBLICATIONS

Askion C-line Systems by Hamilton, Automated Cryogenic Sample Storage, 2016.

(Continued)

*Primary Examiner* — P. Kathryn Wright
(74) *Attorney, Agent, or Firm* — HAMILTON, BROOK, SMITH & REYNOLDS, P.C.

(57) ABSTRACT

A cryogenic storage system includes a transfer module configured to service one or more cryogenic storage freezers. The transfer module includes a working chamber that maintains a cryogenic environment for the transfer of sample tubes between different sample boxes. One or more freezer ports enable the transfer module to receive a sample box extracted from a respective freezer. An input/output (I/O) port enables external access to samples. A box transport robot operates to transport sample boxes between the freezer ports, the working chamber, and the I/O port. A picker robot operates to transfer sample tubes between sample boxes within the working chamber.

41 Claims, 35 Drawing Sheets

(51) Int. Cl.
*G01N 1/42* (2006.01)
*G01N 35/02* (2006.01)
*B65G 47/90* (2006.01)
*F25D 25/04* (2006.01)
*A01N 1/02* (2006.01)
*G01N 1/10* (2006.01)
*B65G 1/137* (2006.01)
*B65G 1/04* (2006.01)

(52) U.S. Cl.
CPC .......... *B65G 47/901* (2013.01); *F25D 25/04* (2013.01); *G01N 1/42* (2013.01); *G01N 35/0099* (2013.01); *G01N 35/026* (2013.01); *B65G 1/0421* (2013.01); *B65G 1/0464* (2013.01); *B65G 1/0485* (2013.01); *B65G 1/137* (2013.01); *G01N 2001/1081* (2013.01); *G01N 2035/00435* (2013.01)

(56) References Cited

U.S. PATENT DOCUMENTS

| | | |
|---|---|---|
| 5,638,686 A | 6/1997 | Coelho et al. |
| 5,921,102 A | 7/1999 | Vago |
| 6,068,437 A | 5/2000 | Boje et al. |
| 6,302,327 B1 | 10/2001 | Coelho et al. |
| 6,941,762 B2 | 9/2005 | Felder et al. |
| 7,013,198 B2 | 3/2006 | Haas |
| 7,314,341 B2 | 1/2008 | Malin |
| 7,527,764 B2 | 5/2009 | Angelantoni et al. |
| 7,861,540 B2 | 1/2011 | Cloutier et al. |
| 8,176,747 B2 | 5/2012 | Howard et al. |
| 8,465,693 B2 | 6/2013 | Pedrazzini |
| 8,636,459 B2 | 1/2014 | Neeper |
| 8,857,208 B2 | 10/2014 | Malin |
| 9,028,754 B2 | 5/2015 | Winter et al. |
| 9,163,869 B2 | 10/2015 | Warhurst et al. |
| 9,201,084 B2 | 12/2015 | Fattinger et al. |
| 9,702,887 B2 | 7/2017 | Neeper et al. |
| 9,731,895 B2 | 8/2017 | Manning et al. |
| 9,835,640 B2 | 12/2017 | Raicu et al. |
| 2007/0172396 A1 | 7/2007 | Neeper et al. |
| 2012/0060514 A1* | 3/2012 | Warhurst ............ A01N 1/0242 414/800 |
| 2012/0283867 A1* | 11/2012 | Gelbman ............... G01N 35/04 700/214 |
| 2013/0011226 A1* | 1/2013 | Camenisch .......... B65G 1/0464 414/277 |
| 2015/0204598 A1* | 7/2015 | Affleck ................... G01F 23/22 220/560.04 |
| 2015/0274423 A1* | 10/2015 | Borodkin .......... G01N 35/0099 700/218 |
| 2016/0288999 A1 | 10/2016 | Caveney et al. |
| 2018/0202908 A1* | 7/2018 | Croquette ............... F25D 11/02 |
| 2018/0272353 A1* | 9/2018 | Malin .................. F25D 25/021 |
| 2019/0277868 A1* | 9/2019 | Privat De Fortune ...................... G01N 35/0099 |

FOREIGN PATENT DOCUMENTS

| | | | |
|---|---|---|---|
| WO | 2017014999 A1 | 1/2017 | |
| WO | WO-2017198628 A1 * | 11/2017 | .......... A01N 1/0242 |

OTHER PUBLICATIONS

Automated loading and transportation of cryogenic, liquefied gases with CRYO.TAS by Cryotas, Apr. 25, 2017 (Retrieved through Wayback Machine).
MVE Automation SeriesTM High Efficiency Freezer by Chart, 2015.
SmartFreezer® by Angelantoni Life Science s.r.l., 2012.
International Search Report and Written Opinion for Int'l Application No. PCT/US2019/022519, titled: Automated Cryogenic Storage and Retrieval System; dated Jun. 25, 2019.
International Preliminary Report on Patentability for Int'l Application No. PCT/US2019/022519, titled: Automated Cryogenic Storage and Retrieval System; dated Sep. 29, 2020.

* cited by examiner

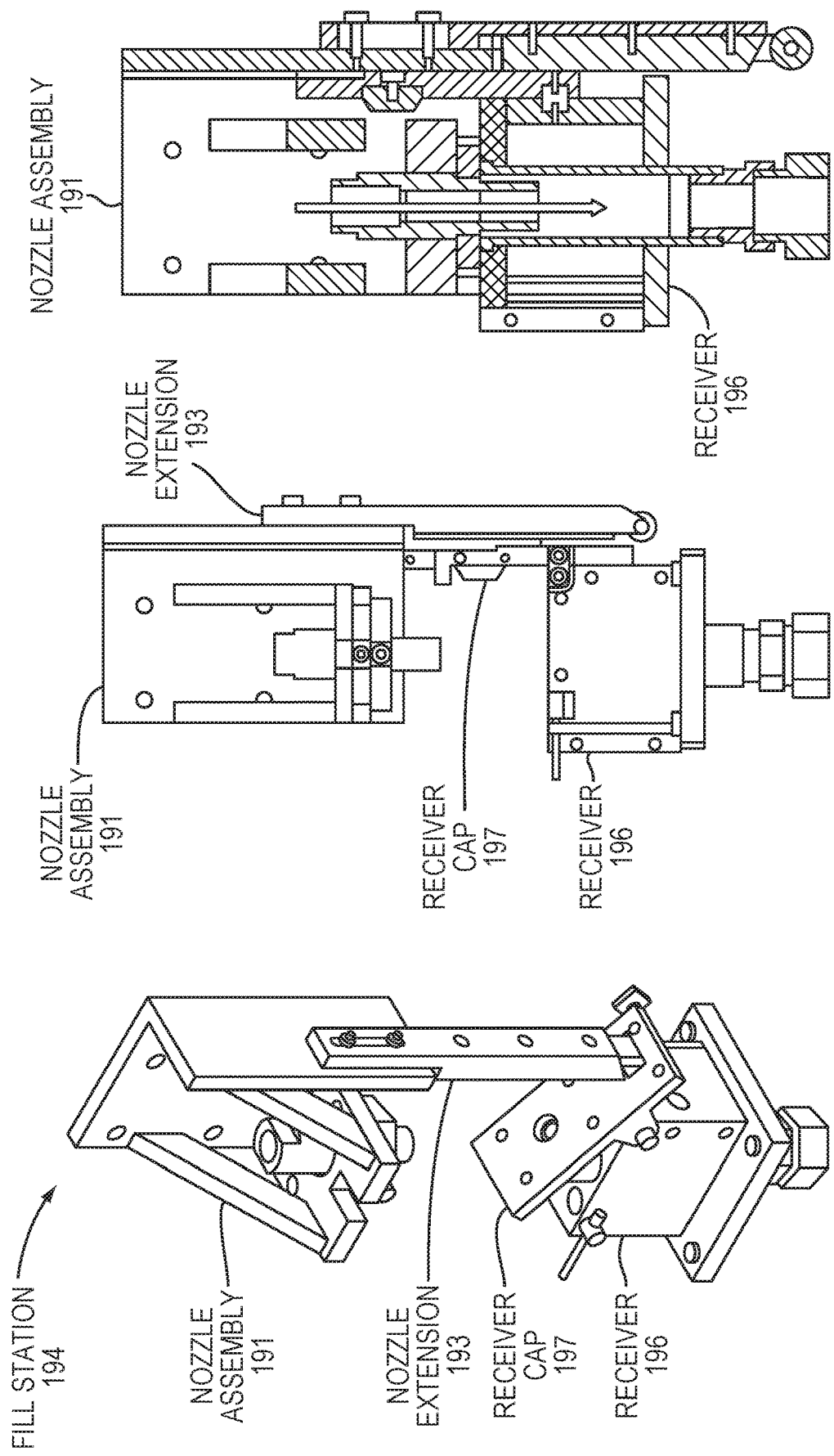

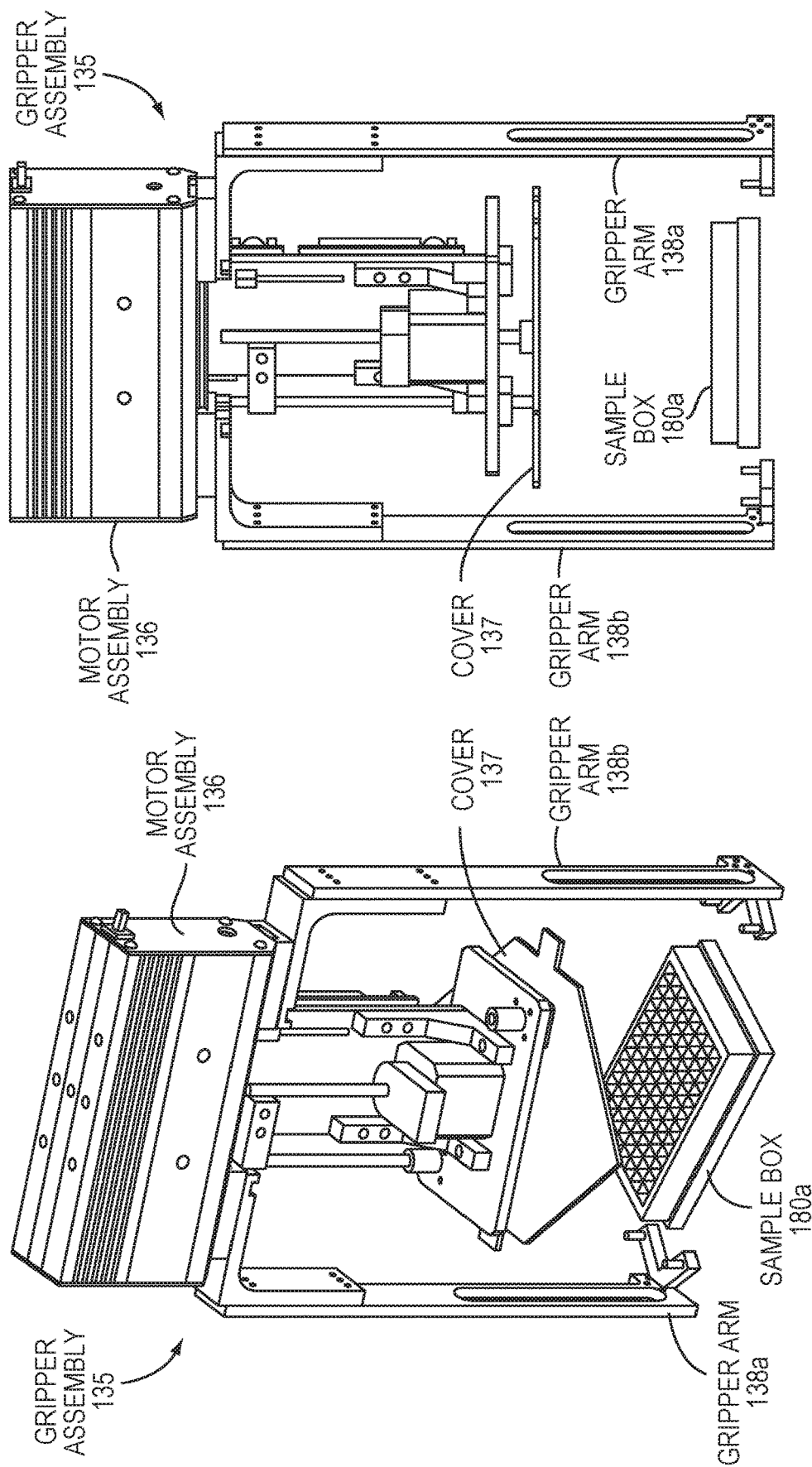

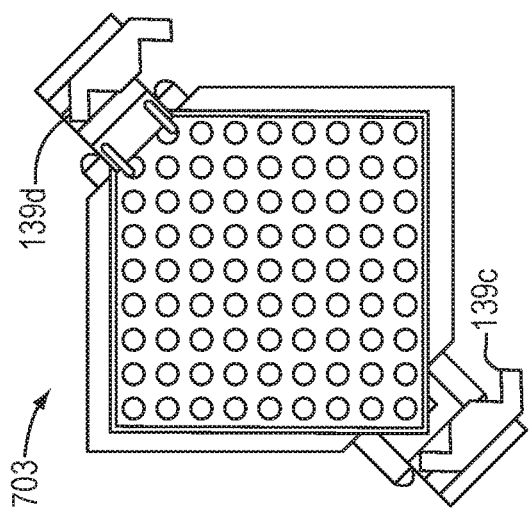
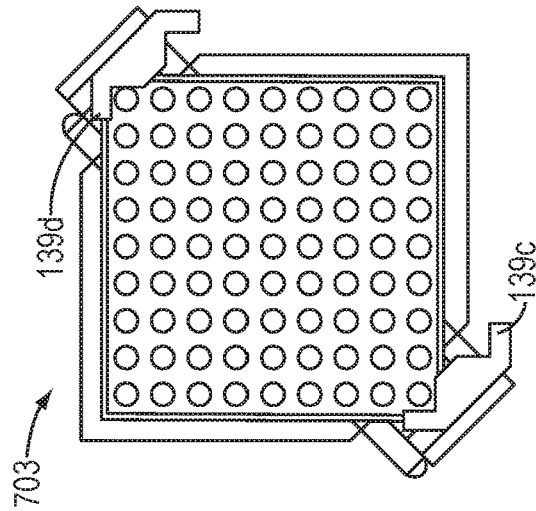
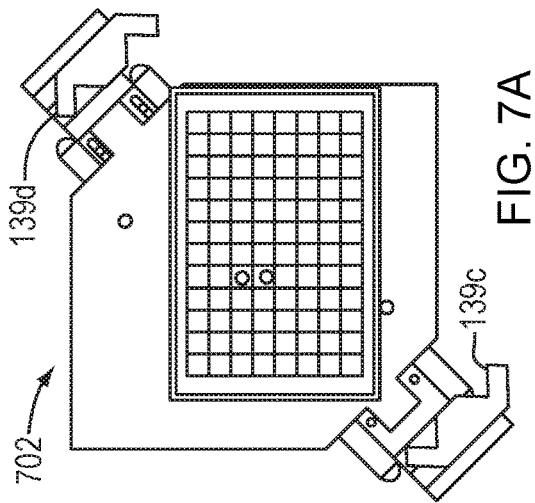
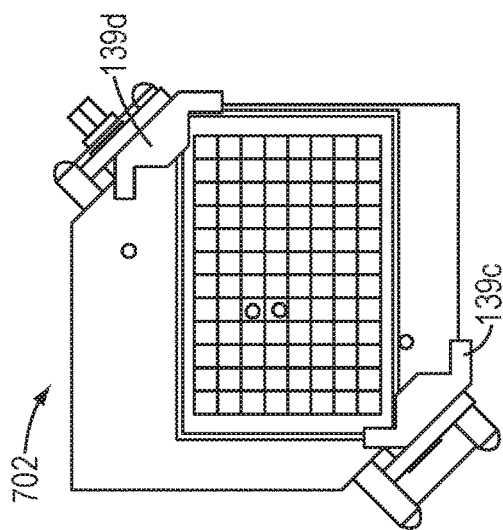
FIG. 7A
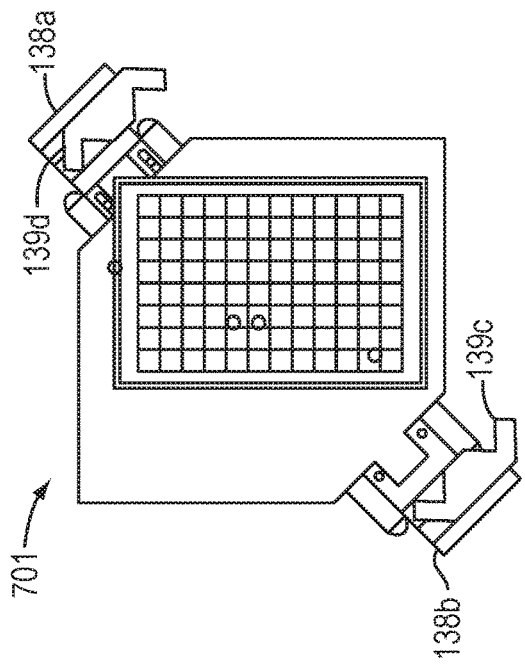
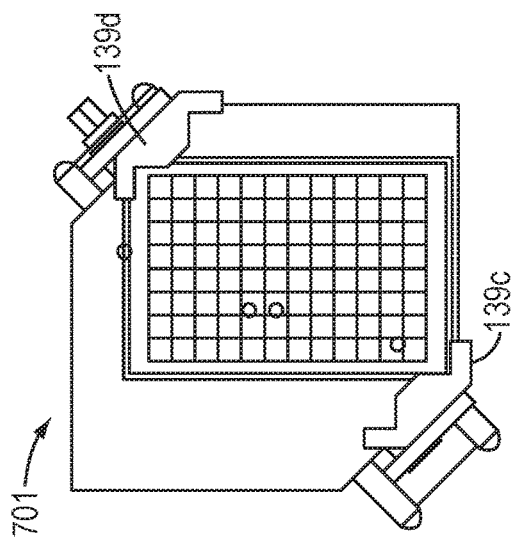
FIG. 7B

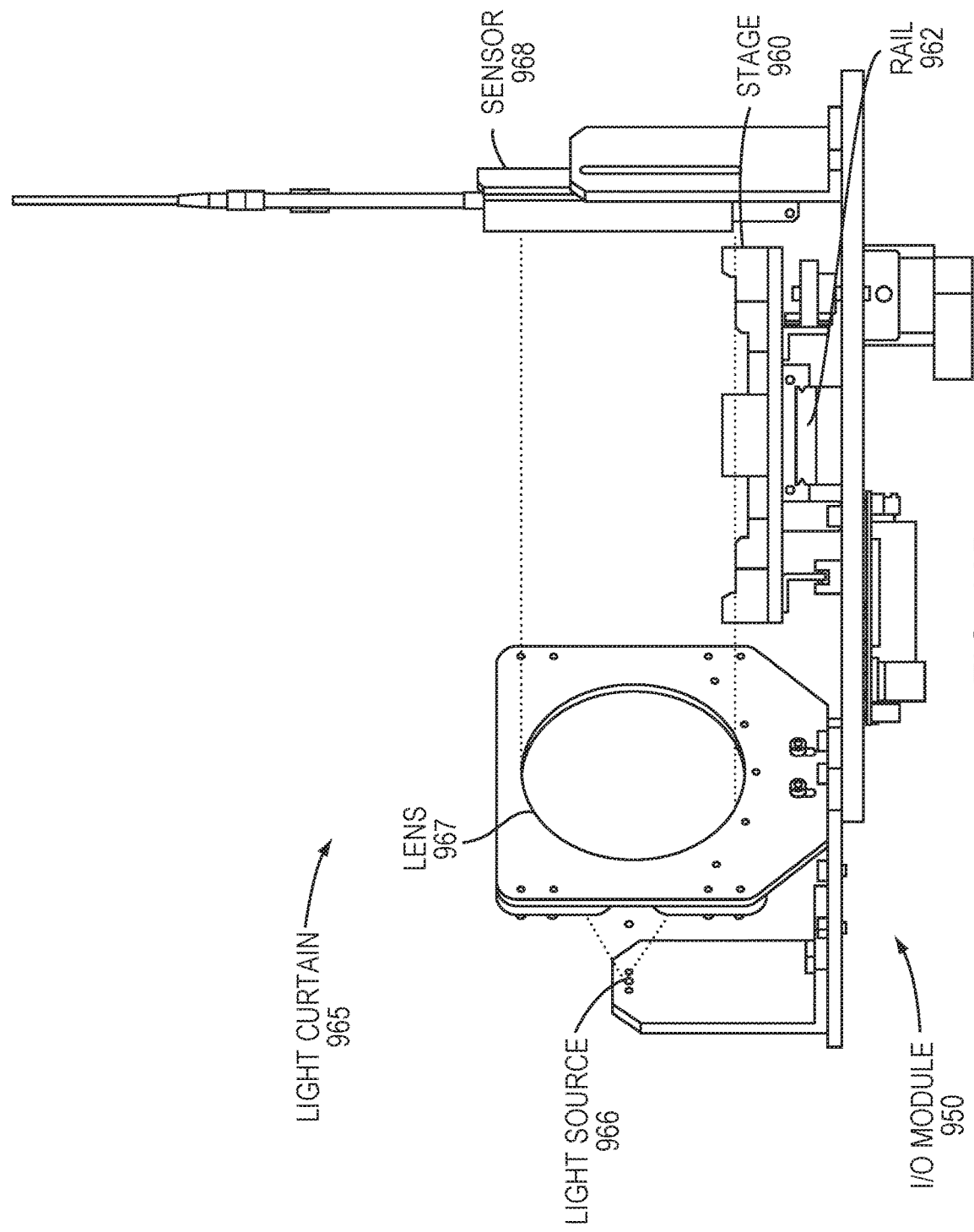

AUTOMATED CRYOGENIC STORAGE AND RETRIEVAL SYSTEM

RELATED APPLICATION

This application claims the benefit of U.S. Provisional Application No. 62/647,450, filed on Mar. 23, 2018. The entire teachings of the above application are incorporated herein by reference.

BACKGROUND

Cryopreservation is a process essential to maintaining the integrity of biological substances over extended periods of storage. At sufficiently low temperatures, all chemical processes and biological functions of such substances are effectively halted, allowing them to be stored safely over nearly any length of time. A cryogenic storage freezer enables such storage by providing an insulated and controlled cryogenic environment to accommodate a number of biological or other samples. In typical storage freezers, samples are loaded into racks or trays, each of which holds several samples. The racks or trays are manually removed from the cryogenic environment of the freezer, presenting the rack or tray to a user for removing samples from, or adding samples to, the storage freezer.

SUMMARY

Example embodiments provide automated storage and retrieval of samples in a cryogenic environment, as well as automated transfer of individual samples between sample boxes. Embodiments can provide for maintaining samples under a cryogenic temperature threshold (e.g., −134° C.) at all times, while also enabling access to samples at all times. The samples may be organized and tracked by scanning a barcode of each sample. Embodiments may also comprise multiple cryogenic storage freezers and provide for transfer of sample boxes and individual samples between the storage freezers, as well as between a storage freezer and an input/output (I/O) port accessible to a user.

In an example embodiment, a cryogenic storage system includes a transfer module configured to service one or more cryogenic storage freezers. The transfer module includes a working chamber that maintains a cryogenic environment for the transfer of sample tubes between different sample boxes. One or more freezer ports enable the transfer module to receive a sample box extracted from a respective freezer. An I/O port enables external access to samples. A box transport robot is configured to transport sample boxes between the freezer ports, the working chamber, the I/O port and other subsystems. A picker robot is configured to transfer sample tubes between sample boxes within the working chamber.

The freezer port can include an ejector configured to transport the first sample box through at least a portion of the freezer port to a position accessible to the box transport robot. The ejector may include a pair of arms configured to clamp opposite sides of the first sample box. The ejector may also include a floor configured to support a sample box, where the floor includes one or more portions that are depressible via a force applied by the box transport robot. The ejector may also be configured to transport a plurality of different sample box formats.

The transfer module may include a transport chamber, the transport chamber being coupled to the freezer port and housing the box transport robot. The box transport robot may maintain an environment above a glass transition temperature of the samples being transported through the chamber, and can be connected to the working chamber via an aperture. Alternatively, the transport chamber can be connected to the working chamber via an intermediate chamber to the aperture, where the intermediate chamber houses at least a portion of the picker robot. The box transport robot may be configured to extend into the working chamber via the aperture during transport of a sample box. The picker robot may be configured to extend into the working chamber via the aperture during transport of a sample tube, such as transfer of the sample tube between sample boxes within the working chamber.

The box transport robot may include a box gripper assembly configured to grip a sample box. The box gripper assembly may include a pair of arms configured to clamp opposing corners of the first sample box, where each arm includes a set of contact points adapted to accommodate a plurality of sample box formats. One or more of the sets of contact points may define a W shape, where a first portion of the W shape accommodates a first sample box format, and a second portion of the W shape accommodates a second sample box format. Alternatively, the contact points may terminate in a pair of pins, where the pins are oriented at a first angle to engage with a first sample box format, and are oriented at a second angle to accommodate a second box format. The box transport robot may also include a rail assembly on which the box gripper assembly moves.

The picker robot may include a first arm including a tube gripper assembly and a second arm including a push-up pin. The second arm may extend under a platform supporting sample boxes in the working chamber, the second arm being configured to drive the push-up pin into the first sample box to raise a portion of the sample tube from a respective sample box. The tube gripper assembly may include a plurality of teeth, the tube gripper assembly configured to rotate the plurality of teeth around and toward a center axis to grip the sample tube. The teeth may also be used to prevent neighboring sample tubes from rising if frozen together. The first arm may be configured to move the sample tube to a position enabling an identification (ID) tag of the sample tube to be read by an ID reader. The position may be internal or external to the working chamber, and the first arm may rotate the sample tube to align the ID tag with the ID reader. The position may enable the ID tag to be read by the ID reader via a reflection of the ID tag from a mirror.

The working chamber may include a platform configured to support multiple sample boxes during a transfer of sample tubes between them. A clamp assembly may be configured to secure a sample box via a force applied to a corner of the sample box, the clamp including a set of contact points adapted to accommodate a plurality of different sample box formats. The set of contact points may define a W shape, where a first portion of the W shape accommodates a first sample box format, and a second portion of the W shape accommodates a second sample box format. The platform may include an aperture exposing a portion of a bottom surface of a sample box, the aperture enabling access to a bottom of the sample tube by the tube picker robot. The working chamber may be further configured to contain a liquid coolant below the platform, as well as a heat sink coupled to the platform and configured to be partially immersed in the liquid coolant. The tube picker may include an arm supporting a push-up pin, the arm configured to be at least partially immersed in the liquid coolant.

The transfer module may include a light curtain configured to detect a format of a sample box at the I/O port. The light curtain may project a single collimated light source.

The transfer module may also include a plurality of freezer ports, each of the plurality of freezer ports being configured to receive sample boxes extracted from a respective freezer. A rail assembly may be configured to move the freezer ports between a plurality of freezers. The rail assembly may be further configured to move the working chamber, the box transport robot, and the tube picker robot in unison with the at least one freezer port. The freezer port may be configured to connect with an extractor assembly (e.g., an automated rack puller), the extractor assembly being configured to raise a storage rack from a freezer and eject the first sample box from the rack.

A robot in an example embodiment may comprise a box gripper assembly configured to grip a sample box. The box gripper assembly may include a pair of arms configured to clamp opposing corners of the sample box, as well as a pair of contact point sets coupled to a respective one of the pair of arms, each of the contact point sets configured to accommodate a plurality of sample box formats. The robot may further include a robotic transport mechanism configured to move the box gripper assembly. The first set of contact points may define a W shape, where a first portion of the W shape accommodates a first sample box format, and a second portion of the W shape accommodates a second sample box format. The robotic transport mechanism may include a rail assembly configured to move the box gripper assembly laterally and vertically. The robotic transport mechanism may include a robotic arm configured to move the box gripper assembly.

A robot in a further embodiment may be configured to pick and transfer sample tubes. The robot may include a first arm and a second arm. A tube gripper assembly may be coupled to the first arm and include a plurality of teeth, the tube gripper assembly configured to rotate the plurality of teeth around and toward a center axis to grip a sample tube. A push-up pin may be coupled to the second arm, the second arm being configured to drive the push-up pin into a sample box to raise a portion of the sample tube from the sample box prior to engagement by the tube gripper assembly. The robot may further include a motor configured to actuate the tube gripper assembly via an axle extending along the first arm.

A further embodiment may include a cryogenic sample handling system. The system may include a working chamber configured to maintain a cryogenic environment. A platform, housed within the working chamber, may be configured to support a plurality of sample boxes. A box transport robot may be configured to transport a first sample box into and out of the working chamber. A picker robot may be configured to transport, within the working chamber, a sample tube between the first sample box and a second sample box. The working chamber may be further configured to contain a liquid coolant below the platform. A heat sink may be coupled to the platform and configured to be partially immersed in the liquid coolant.

The tube picker robot may include an arm supporting a push-up pin, the arm configured to be at least partially immersed in the liquid coolant.

A method for reading an indicia from a sample container may include, first, picking a sample container in a cryogenic environment using a picker robot. Frost is removed from the sample container while the sample container is at least partially within the cryogenic environment. The indicia may be read from the sample container, and the sample container may then be placed.

Removing the frost may include mechanically removing the frost. Reading the indicia may occur at least partially in the cryogenic environment. Placing the sample container may include placing the sample container into the cryogenic environment. The indicia may be a barcode or at least one of an alphanumeric character, a graphic, and a symbol. Removing the frost may include moving the sample container against a frost removal device using the picker robot. The frost removal device may be a brush or a blade. The frost removal may occur while the sample container is fully within the cryogenic environment, and while a sample contained in the sample container is kept below the glass transition temperature of the sample. Reading the indicia from the sample container may occur while a sample contained in the sample container is kept below the glass transition temperature of the sample. Reading the indicia from the sample container may include reading the indicia with an optical device, such as a camera.

Further embodiments include methods of picking and transporting an individual sample box or an individual sample tube implementing one or more of the operations and/or apparatuses described herein.

Further embodiments may include methods for transporting a sample. The sample may be removed from a first cryogenic environment. The sample may be placed into a second cryogenic environment wherein the second cryogenic environment is contained within an mobile apparatus. The sample may then be moved from a first sample receptacle to a second sample receptacle within the second cryogenic environment. The mobile apparatus may be automated. At least one of the removing the sample from the first cryogenic environment and the placing the sample into the second cryogenic environment may occur while the sample is kept below the glass transition temperature of the sample. The first and second cryogenic environments may be independently maintained.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 1A-I illustrate an automated cryogenic storage system and related components in an example embodiment.

FIGS. 5A-B illustrate a gripper assembly for a box picker robot.

FIGS. 7A-B illustrate a box gripper in a further embodiment.

FIGS. 10A-B illustrate an I/O module in one embodiment.

DETAILED DESCRIPTION

A description of example embodiments follows. The teachings of all patents, published applications and references cited herein are incorporated by reference in their entirety.

Figure 1A:
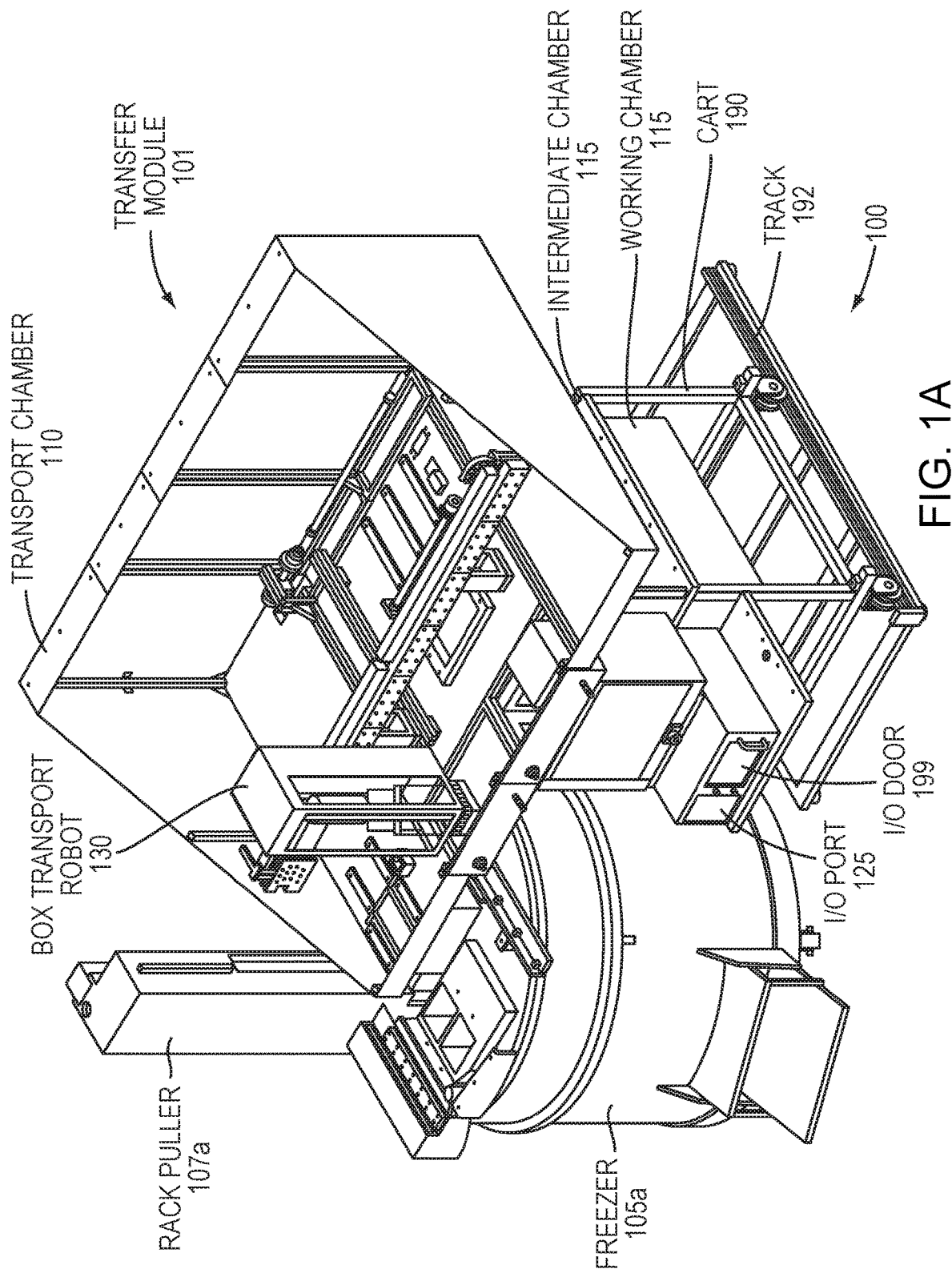

FIGS. 1A-F illustrate an automated cryogenic storage system 100 and components in an example embodiment. FIG. 1A shows a perspective view of the system 100, which includes a transfer module 101, a freezer 105a, and a rack puller 107a. The freezer 105a is a storage freezer that maintains a cryogenic environment for storing multiple samples, such as sample tubes assembled in sample boxes. In the illustrated embodiments, the freezer 105a is a cylindrical vessel; however, the freezer can have any shape such as, for example, a rectangular box. In some preferred embodiments, freezer 105a includes an external wall or shell separated from an inner wall or shell by a vacuum insulated space (e.g., a dewar vessel). The rack puller 107a may be mounted to the top of the freezer 105a, and operates to raise a selected storage rack from the freezer 105a. Once raised, a sample box can be added or removed from the rack, and the rack puller 107a may then replace the rack into the freezer 105a. Alternatively, the rack puller 107a may be mounted to the transfer module 101, and the rack puller 107a may be selectively positioned to operate with the freezer 105a as well as one or more other freezers (not shown). Example freezers and rack pullers that may be implemented in the system 100 are described in further detail in U.S. patent application Ser. Nos. 15/085,431 and 15/085,630, the entire teaching of which are incorporated herein by reference.

The transfer module 101 operates to transfer sample boxes, as well as individual sample tubes, between locations while maintaining those samples below a respective glass transition temperature $T_G$ (e.g., −134 C), thereby maintaining the integrity of those samples. For example, the module 101 may transfer sample boxes between the freezer 105a, additional freezers (not shown), and an input/output (I/O) port 125, and may transfer sample tubes between those boxes. The I/O port 125 may be configured to accept a portable storage unit (not shown) storing one or more sample boxes, and a user may insert and remove the portable storage unit via an I/O door 199. An example portable storage unit that may be implemented with the system 100 is described in further detail in U.S. patent application Ser. No. 14/600,751, the entire teaching of which are incorporated herein by reference.

The transfer module 101 may also relocate in order to service other freezers (not shown) in addition to the freezer 105a. A cart 190 supports the transfer module 101, and enables the module to move along a track 192. The cart 190 may be propelled automatically by a motor assembly in response to a movement command, or may be moved by a user. Thus, in further embodiments described below, wherein the transfer module 101 services multiple freezers, the cart 190 and track 192 enables the transfer module 101 to relocate to each of those multiple freezers. In further embodiments, a motion system for the transfer module 101 may be configured above the module 101 in addition to (or in place of) the cart 190 and track 192. Further, in place of the track 192, the module 101 may be moved using a trackless motion system that uses a local positioning system (e.g., GPS, WiFi, optical (e.g. camera based), radar, lidar, floor or freezer mounted sensors). Propulsion can be provided to the transfer module by any known motion system, such as on-board motors that drive wheels or gears, in floor linear motors, off-board motors that drive cables or gears, or an overhead gantry system.

Figure 1B:
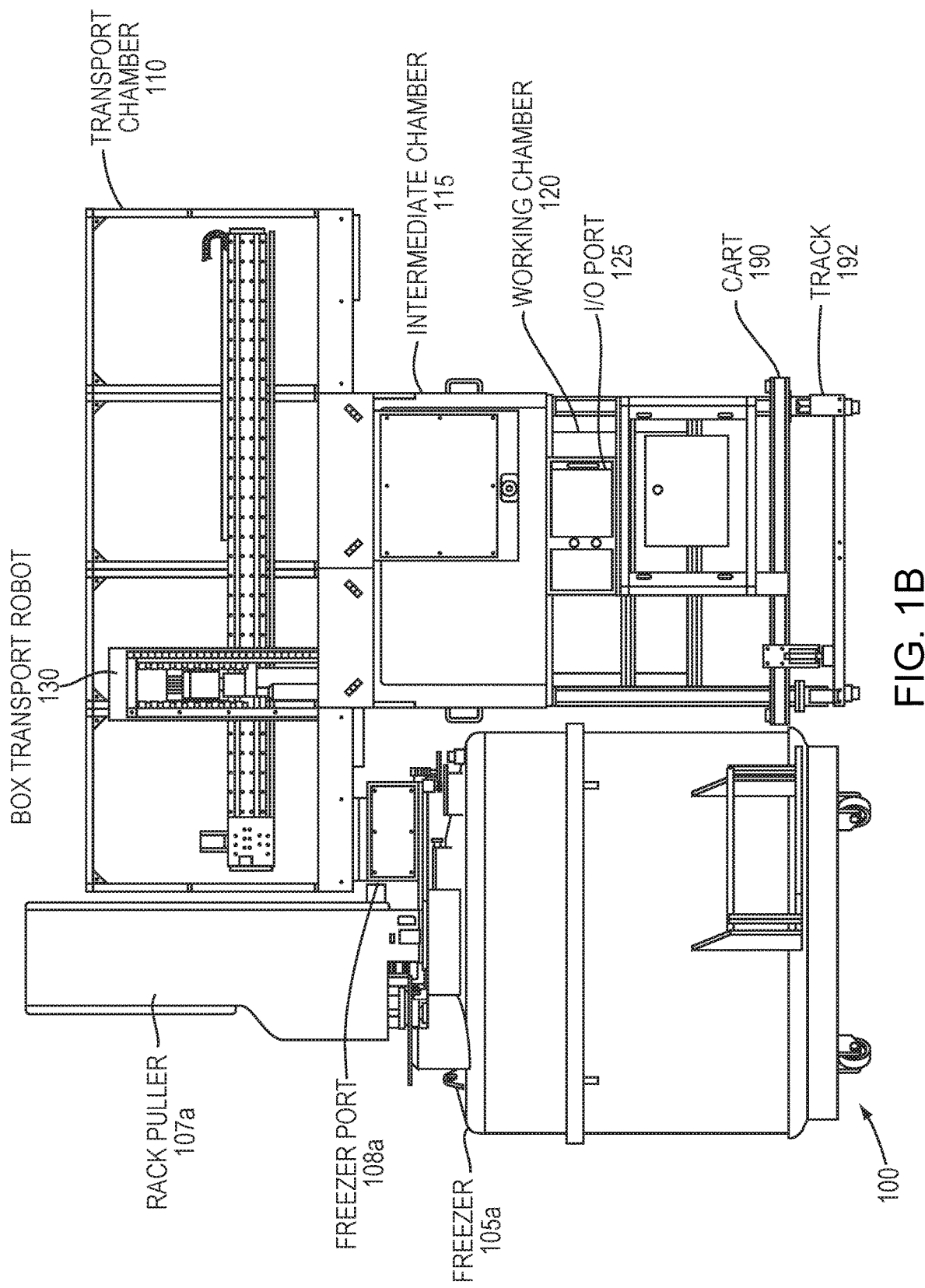

FIG. 1B illustrates a front view of the system 100. Here, the disposition of the transfer module 101 is shown in further detail. The transfer module 101 may include three chambers: a transport chamber 110, an intermediate chamber 115, and a working chamber 120. The chambers 110, 115, 120 may be coupled to one another in series, and passage between the chambers may be selectively enabled via automated doors (not shown). The transport chamber 110, in both FIGS. 1A and 1B, is shown in a cutaway view to illustrate components internal to the chamber 110, including a box transport robot 130. The transport chamber 110 may be closed as shown in FIG. 1E, which may contribute to preserving the temperature of the samples below a glass transition temperature. The box transport robot 130 operates to transport sample boxes between the freezer 105a, the I/O port 125, the working chamber 120, which it accesses by passing through the intermediate chamber 115, and additional locations. A freezer port 108a facilitates the transfer of sample boxes between the freezer 105a and the transfer module 101. In particular, the rack puller 107a, after raising a storage rack from the freezer 105a, may propel the sample box into the freezer port 108a. The freezer port 108a, in turn, may position the sample box for pickup by the box transport module 130. Conversely, when returning or storing a sample box to the freezer 105a, the freezer port 108a may propel the sample box toward the rack puller 107a, where it is added to a rack before the rack puller 107a lowers the rack into the freezer 105a. The freezer port 108a may be mounted to the freezer 105b and couples to the transport chamber 110 when the transfer module 101 is positioned to access the freezer 105a. In such a configuration, the transport chamber 110 may include a port (e.g., an aperture) for connecting to the freezer port 108a, or may include a component of the freezer port 108a. Alternatively, the freezer port 108a may be mounted to the transport chamber 110, and aligns with the rack puller 107a when the transfer module 101 is positioned to access the freezer 105a.

The working chamber 120 maintains a cryogenic environment, and enables the selection and transfer of individual sample tubes between sample boxes. In contrast, the intermediate chamber 115 and transport chamber 110 may maintain temperatures and humidity above that of a cryogenic environment. For example, the transport chamber 110 may be configured absent active temperature or humidity control, and, thus, may maintain a temperature comparable to room temperature. The intermediate chamber 115 may be configured similarly. However, both chambers 110, 115 may be cooled and/or dehumidified via convection from the cryogenic environment of the working chamber 120 and/or other cooling and/or dehumidifying methods. In further embodiments, the module 101 may include chambers in a different configuration. For example, a single chamber may encompass both the transport chamber 110 and intermediate chamber 115, or the intermediate chamber 115 may be omitted, the transport chamber 110 being coupled directly to the working chamber.

Figure 1C:
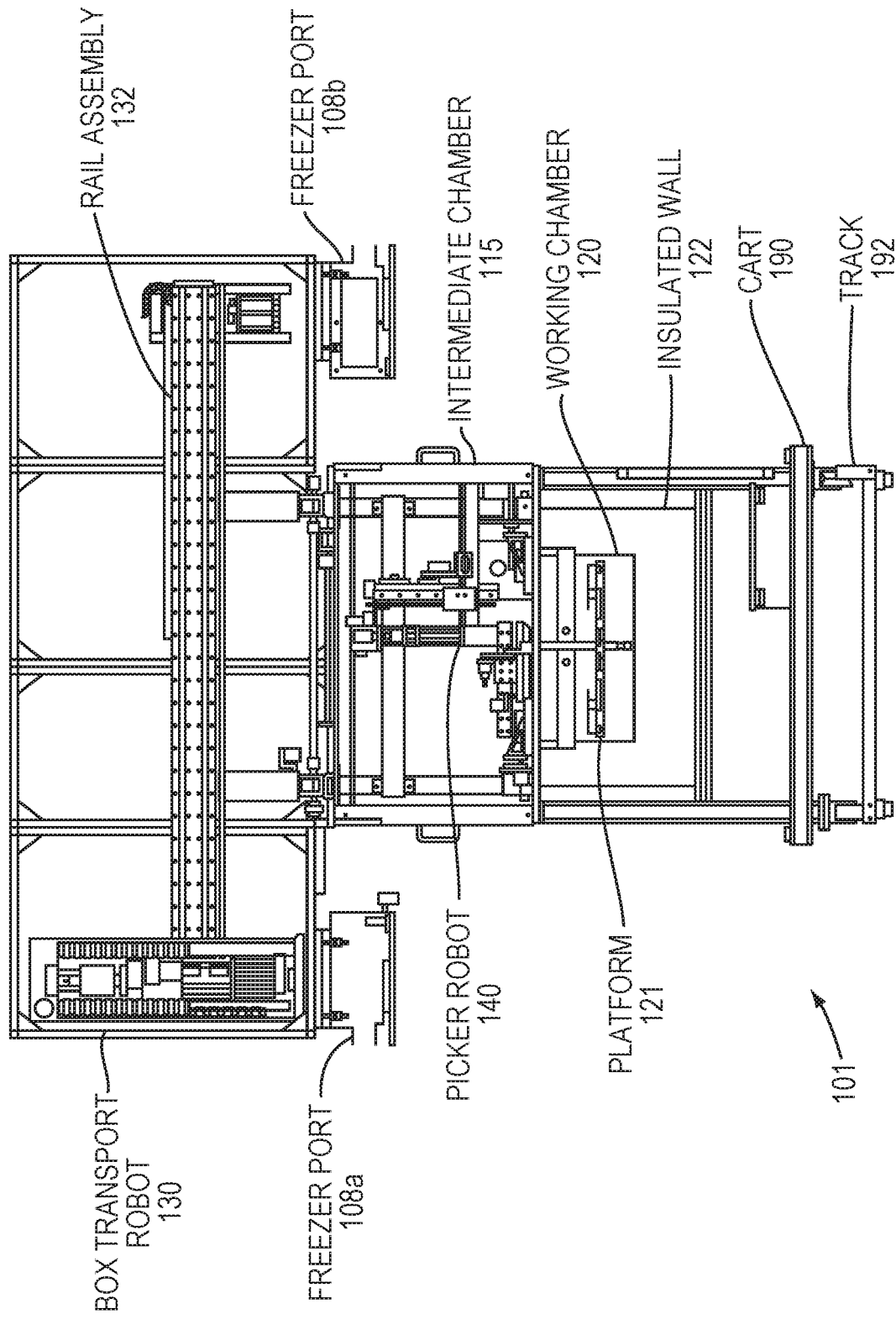

FIG. 1C shows a cross-section view of the transport module 101. Here, a second freezer port is shown 108b for servicing a freezer on an opposite side of the module 101 from the freezer 105a. The working chamber 120, as indicated above, is configured to maintain a cryogenic environment, thereby preserving the temperature of the samples within it below a respective glass transition temperature $T_G$ of the samples (e.g., −134 C). To facilitate this environment, an insulated wall 122 encompasses the bottom and sides of the chamber 120, and the top of the chamber 120 may be substantially isolated from the intermediate chamber 115 (e.g., via a removable cover or door) when sample boxes are not being transferred into or out of the working chamber 120. The working chamber 120 houses a platform 121 that supports multiple sample boxes and configurations, which are moved into and out of the working chamber 120 by the box transport robot 130.

The intermediate chamber 115 houses operational machinery as described in further detail below, including the picker robot 140. The picker robot 140 operates to transfer individual sample tubes between sample boxes within the working chamber 120. The picker robot 140 substantially resides in the intermediate chamber 115, extending partially into the working chamber 120 during a sample transfer operation. As a result, the picker robot 140 may avoid adverse effects of exposure to the cryogenic environment of the working chamber 120.

Figure 1D:
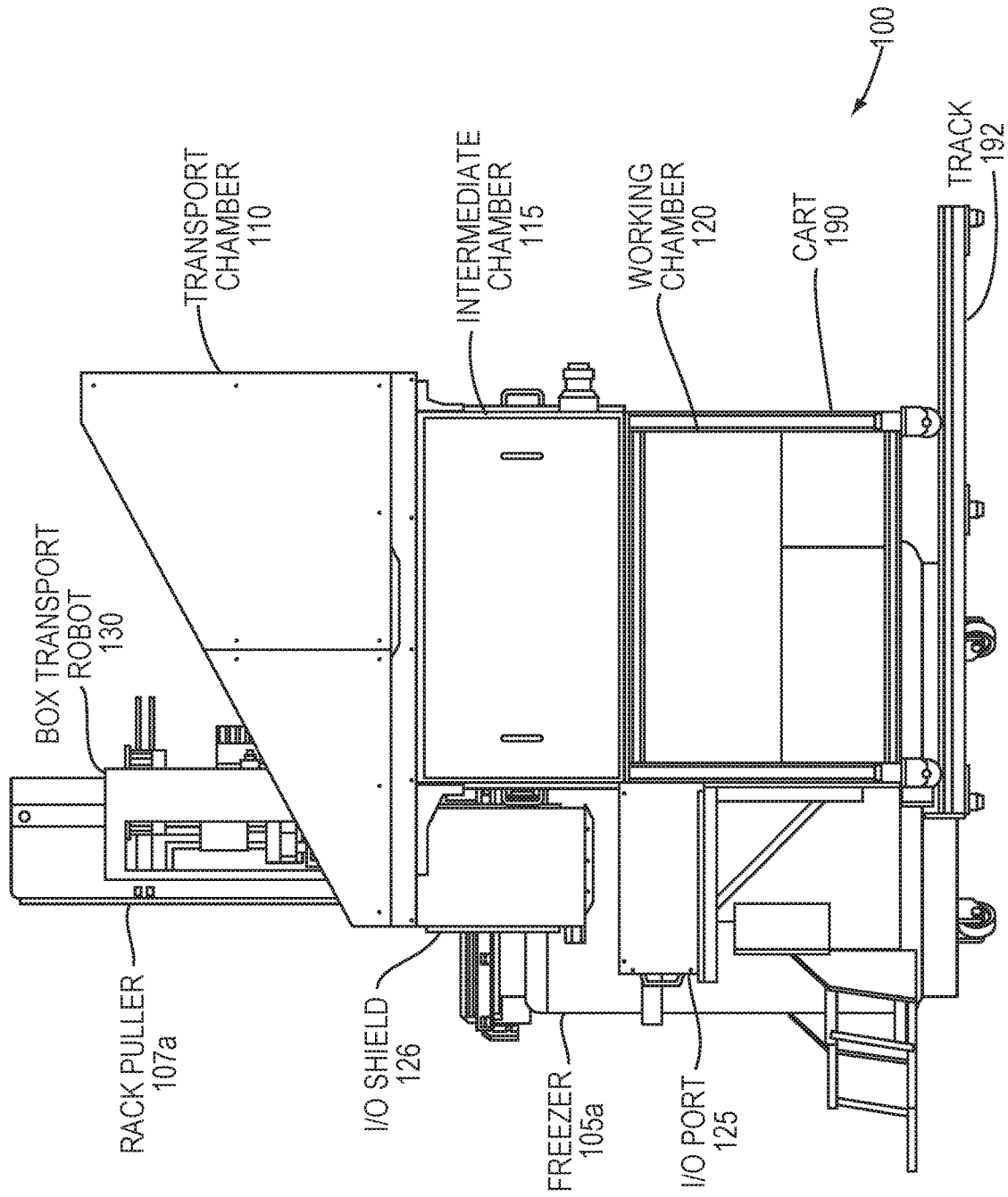
Figure 1E:
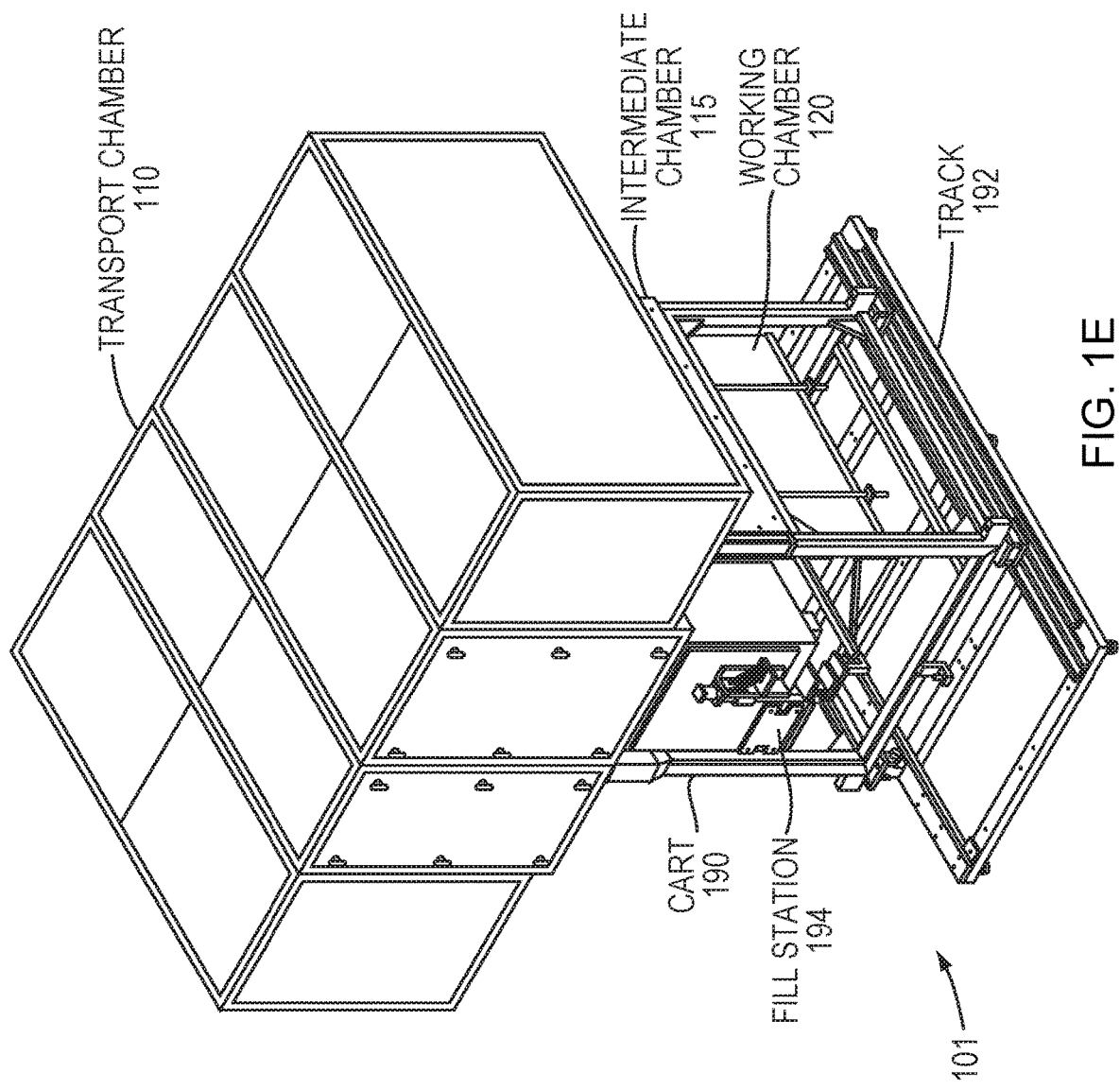

FIG. 1D illustrates a side view of the system 100. Here, an I/O shield 126 is shown more clearly. The I/O shield 126 may be coupled to one or both of the I/O port 125 and the transport chamber 110, and serves as a passageway between them. When the box transport robot 130 adds or removes a sample box from the I/O port 125, it extends through the I/O shield 126. The I/O shield 126 therefore may protect the sample box and robot 130 from interference. The I/O shield 126 may also include a removable cover or door at the threshold of the transport chamber 110 to reduce gas transfer between the transport chamber 110 and the external environment.

FIG. 1E illustrates the transfer module 101 in a further view. Here, the transport chamber 110 is shown with its enclosure intact, and a fill station 194 may be located at the front, rear or side of the module 101, and is described in further detail below with reference to FIGS. 1G-I. The fill station 194 may connect to a liquid coolant source, and directs a liquid coolant (e.g., a cryogenic fluid such as liquid nitrogen) to the working chamber 120 where it cools the working chamber to a cryogenic temperature.

Figure 1F:
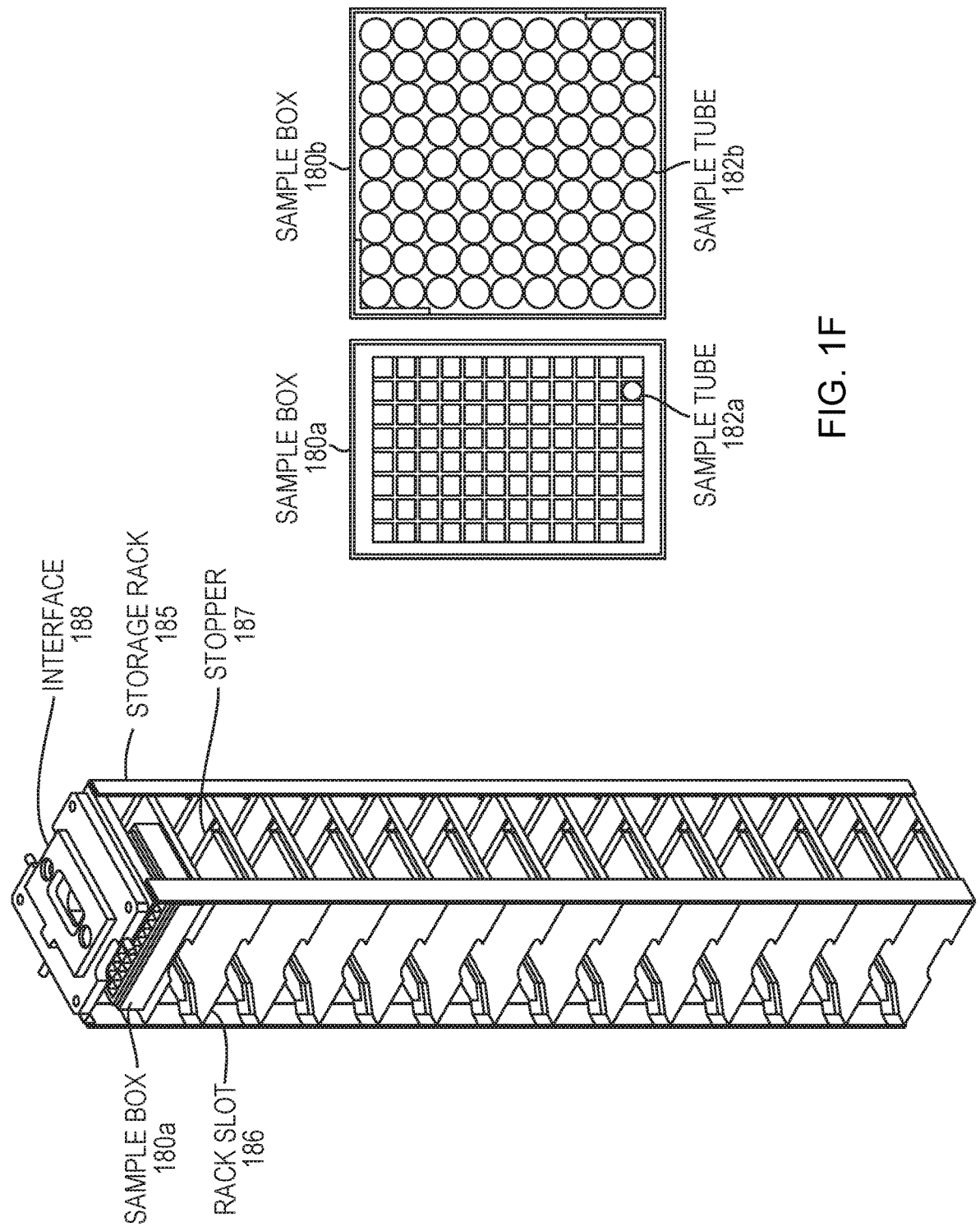

FIG. 1F illustrates an example storage rack 185 and sample boxes 180a-b that may be implemented in the system 100. The system 100 may be configured to store and transfer sample boxes of multiple different formats. For example, sample boxes 180a and 180b, shown in top-down view, correspond to a Society for Biomolecular Screening (SBS) standard format box and a Cryobox standard format box, respectively. Each sample box 180a-b includes multiples slots for storing samples, such as sample tubes 182a-b.

The storage rack 185 includes multiple rack slots (e.g., rack slot 186) for storing respective sample boxes. The freezer 105a may store multiple storage racks resembling the storage rack 185, and the rack puller 107a may raise the storage rack 185 from the freezer 105a by engaging with an interface 188 mounted to the top of the storage rack 188. To accommodate storage of sample boxes in different formats, the rack slot 186 may be adapted to accommodate the largest box format (e.g., sample box 180b, Cryobox), and may optionally include a stopper 187 positioned to accommodate a smaller box format (e.g., sample box 180a, SBS). The stopper 187 may prevent the sample box 180a from moving to the rear of the storage rack 185, thereby maintaining a face of the sample box 180a at a front face of the storage rack 187. The stopper 187 may be omitted from slots accommodating the larger box format, or may be shaped to allow passage by the larger box format. As a result, the storage rack 185 can store and present the sample boxes 180a-b in a uniform manner. Alternatively, to provide greater storage capacity and maximize use of space within a freezer, the storage rack 187 may be adapted to accept a single, uniform box format and orientation.

FIGS. 1G-1I illustrate the fill station 194 in further detail. FIG. 1G is a perspective view of the fill station 194. A receiver 196 may extend from the transfer module 101 to receive a liquid coolant for cooling the working chamber 120, and is covered by a receiver cap 197. A nozzle assembly 191 may extend from a liquid coolant source, and may be integrated into a wall proximate to the receiver 196 when the transfer module 101 is at a particular location. A controller (e.g., controller 195 described below) may control the flow of the coolant to the working chamber 120 based on a detected temperature and/or other conditions at the working chamber 120. The controller may control a valve or other component controlling flow at the nozzle assembly 191, and may be integral to the wall and/or an access panel (e.g., access panel 1510 described below).

Prior to a transfer of liquid coolant, the nozzle assembly 191 may descend onto the receiver 196. The nozzle assembly includes an extension 193 projecting downward such that, during the descent, the extension 193 may contact the receiver cap 197 and cause the receiver cap 197 to swing open and to the side, exposing the top of the receiver 196 as shown in the side view in FIG. 1H. The nozzle assembly 191 may continue to descend until it is coupled with the receiver 196, as shown in the cross-section view of FIG. 1I. Once coupled, the nozzle assembly 191 may transfer the liquid coolant to the receiver 196 as indicated by the arrow in FIG. 1I.

Figure 2:
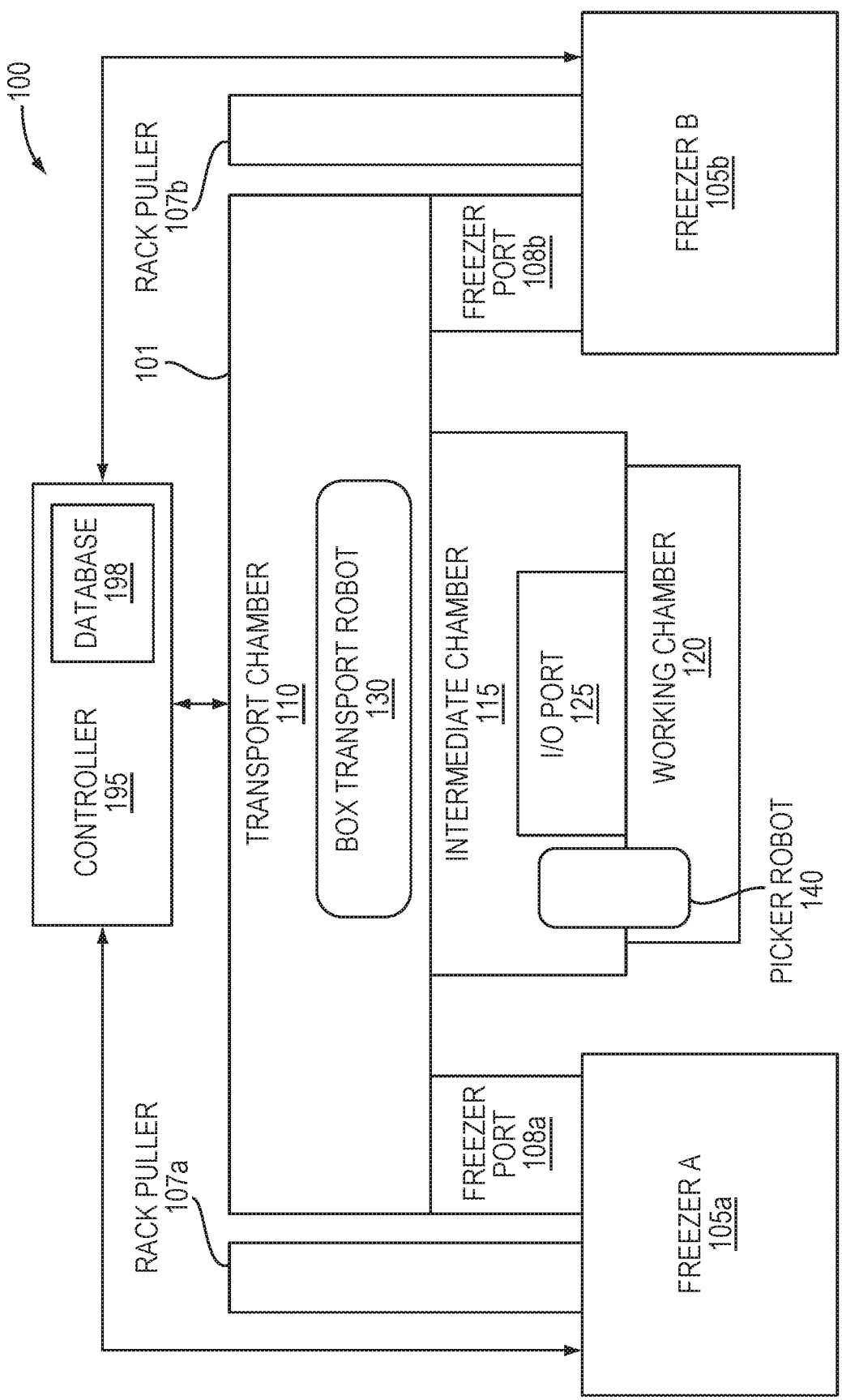
FIG. 2 is a block diagram of a cryogenic storage system including a controller in a further embodiment.

FIG. 2 is a block diagram of the cryogenic storage system 100 configured with a controller 195 in a further embodiment. As shown, the system 100 includes a second freezer 105b, which can be selectively coupled to the transfer module 101 via the freezer port 108b. The controller 195 may be connectively coupled to the transfer module 101 and the freezers 105a-b, and may generally control some or all of the operations of each. For example, the controller 195 may control the freezers 105a-b and respective rack pullers 107a-b to retrieve and replace selected sample boxes (e.g., sample boxes 180a-b) to and from the freezers 105a-b. The controller 195 may also control the transfer module 101 to transport sample boxes between the freezer ports 108a-b, the I/O port 125, and the working chamber 120, and to transfer sample tubes between sample boxes in the working chamber 120. Further, the controller 195 may monitor and control refrigeration and humidity levels of the transfer module 101 (particularly the working chamber 120) and the freezers 105a-b, and may control other operations such as calibration of mechanical components, identifying samples, and failure or disaster recovery. The controller 195 may also maintain a database 198 storing information regarding the samples stored within the working chamber 120 and freezers 105a-b, including the location of each sample within the freezers 105a-b. The controller 195 may update the database 198 in response to the transfer of samples into or out of the freezers 105a-b.

To provide such control operations, the controller 195 may include suitable computer hardware and software resources, such as one or more computer workstations and an interface configured for communication with the transfer module 101 and freezers 105*a-b*. The controller 195 may also include an interface (e.g., a workstation) allowing a user to monitor the system 100 as well as monitor and/or control the aforementioned operations of the system 100.

Figure 3:
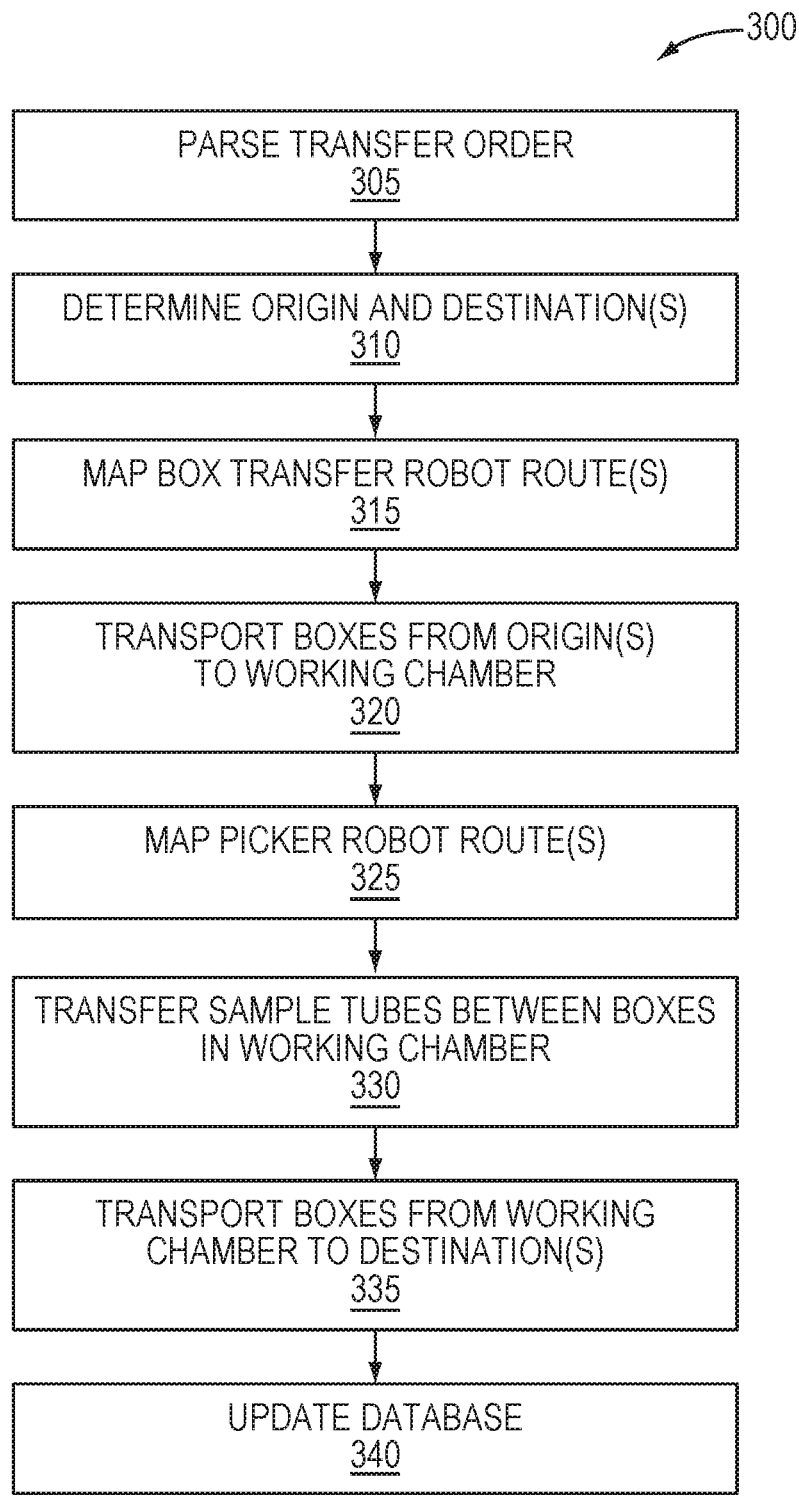
FIG. 3 is a flow diagram illustrating a process of transferring individual samples in one embodiment.

FIG. 3 is a flow diagram illustrating a process 300 of transferring samples, which may be carried out by the system 100 described above with reference to FIGS. 1A-E and 2. With reference to FIG. 2, the controller 195 may parse a transfer order, which specifies one or more sample tubes (e.g., sample tubes 182*a-b*) and/or sample boxes (e.g., sample boxes 180*a-b*) to be transferred (305). The transfer order may specify one or more of an origin, a destination, and one or more sample identifiers (IDs) that identify a sample box 180*a* and/or sample tubes. For example, a transfer order may specify:

a) storage of a sample box 180*a* at the I/O port 125 to a specified or unspecified freezer (e.g., freezer 105*a*),
b) retrieval of a specified storage box or sample tube to the I/O port 125,
c) transfer of a specified sample box 180*a* to a specified freezer,
d) retrieval of a specified individual or set of sample tubes to the I/O port 125,
e) transfer of specified sample tubes between sample boxes, or
f) transfer of the contents of a specified freezer to another freezer or the I/O port 125.

Based on the transfer order, the controller may determine the origin and destination of the samples to be transferred (310). To do so, the controller 195 may refer to the database 198 to determine the present location of the samples, and/or may cause the transfer module 101 to perform a scan of the samples (e.g., via an ID reader) to determine the respective sample IDs. With this information, the controller 195 may then map a route to be taken by the box transfer robot 130 to carry out the transfer (315). If the transfer requires a transfer in individual sample tubes between sample boxes, then the controller 195 may command the box transport robot 130 to transport one or more sample boxes to the working chamber 120 (320). For example, the controller 195 may command the box transport robot 130 to 1) pick up a sample box 180*a* at the freezer port 108*a* and transport it to a selected support surface in the working chamber 120, and 2) pick up a second sample box at the I/O port 125 and transport it to another selected support surface in the working chamber 120. The controller 195 may also command the freezers 105*a-b* and rack pullers 107*a-b* to retrieve and produce the sample boxes at the respective freezer ports 108*a-b*.

In order to transfer sample tubes between sample boxes, the controller 195 may map a route to be taken by the picker robot 140 within the working chamber 120 (325). In doing so, the controller may refer to the database 198 to determine the location of each sample tube within the sample boxes, as well as available slots within the sample boxes. The controller 195 then commands the picker robot 140 to operate according to the mapped route to effect the transfer of the sample tubes between the sample boxes (330). The picker robot 140, when transferring each sample tube, may also route the sample tube to a brush to remove frost from the sample tube followed by an ID reader (located, e.g., in the intermediate chamber 115) to confirm the sample ID of the sample tube. Once the sample tubes are relocated to their target sample boxes, the controller 195 may then command the box transport robot 130 to transport the sample boxes from the working chamber 120 toward their destination(s) (e.g., the freezer ports 108*a-b*, the I/O port 125) (335). The controller 195 may also command the freezers 105*a-b* and rack pullers 107*a-b* to accept sample boxes deposited to the freezer ports 108*a-b*, place those boxes into a designated slot 186 in a storage rack 185, and return the storage rack 185 to the respective freezer 105*a-b*. The controller 195 may then update the database 198, based on the transfer, to indicate the updated location of each of the samples and/or sample boxes involved in the transfer.

Alternatively, if the transfer order 305 does not require a transfer of sample tubes between sample boxes, then the controller 195 may command the box transport robot 130 to transport the samples boxes directly from their origin to their destination, without first locating to the working chamber 120. In such a transfer, the operations 320-335 may be omitted.

Figure 4A:
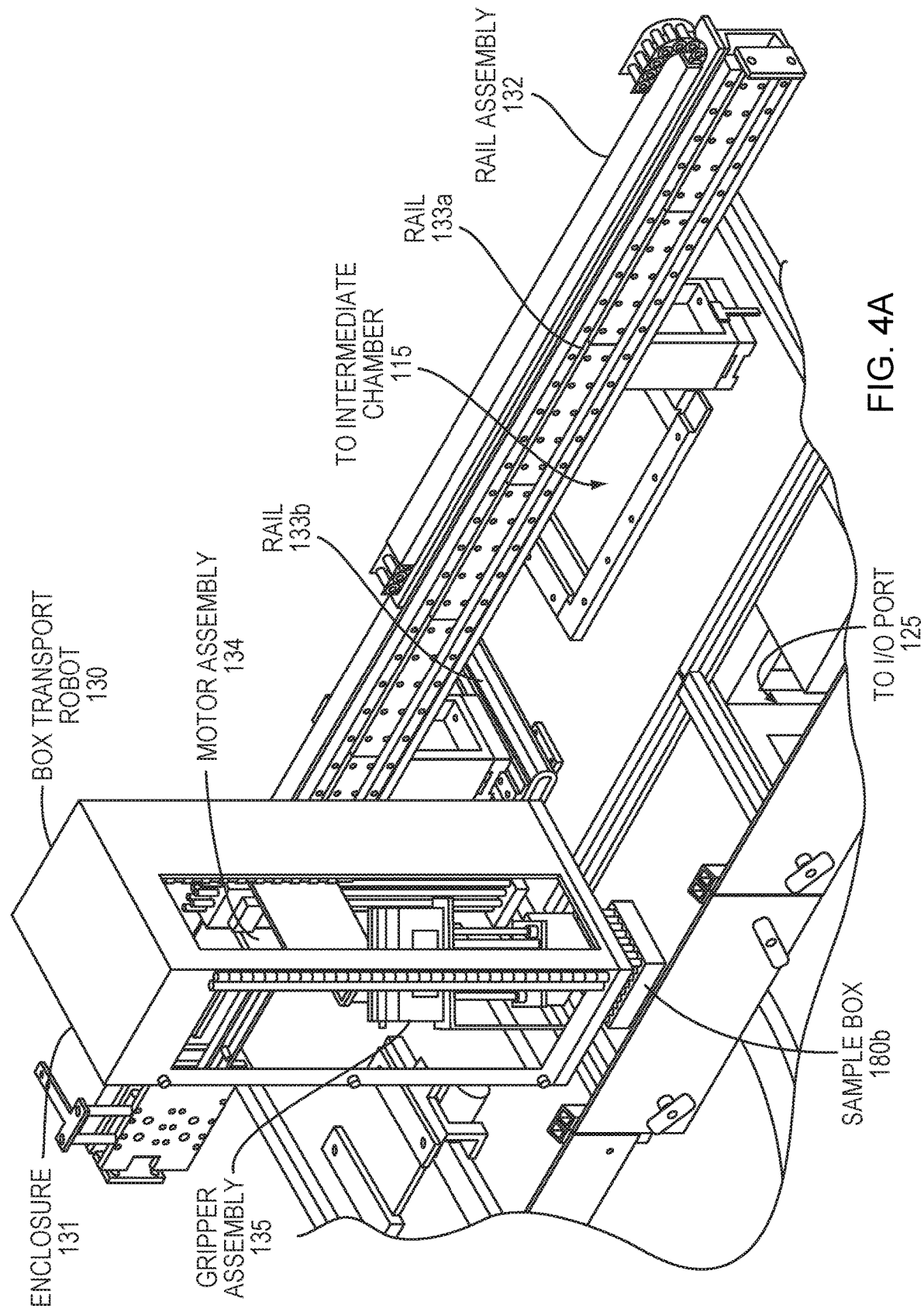
FIG. 4A-B illustrate a box transport robot in one embodiment.
Figure 4B:
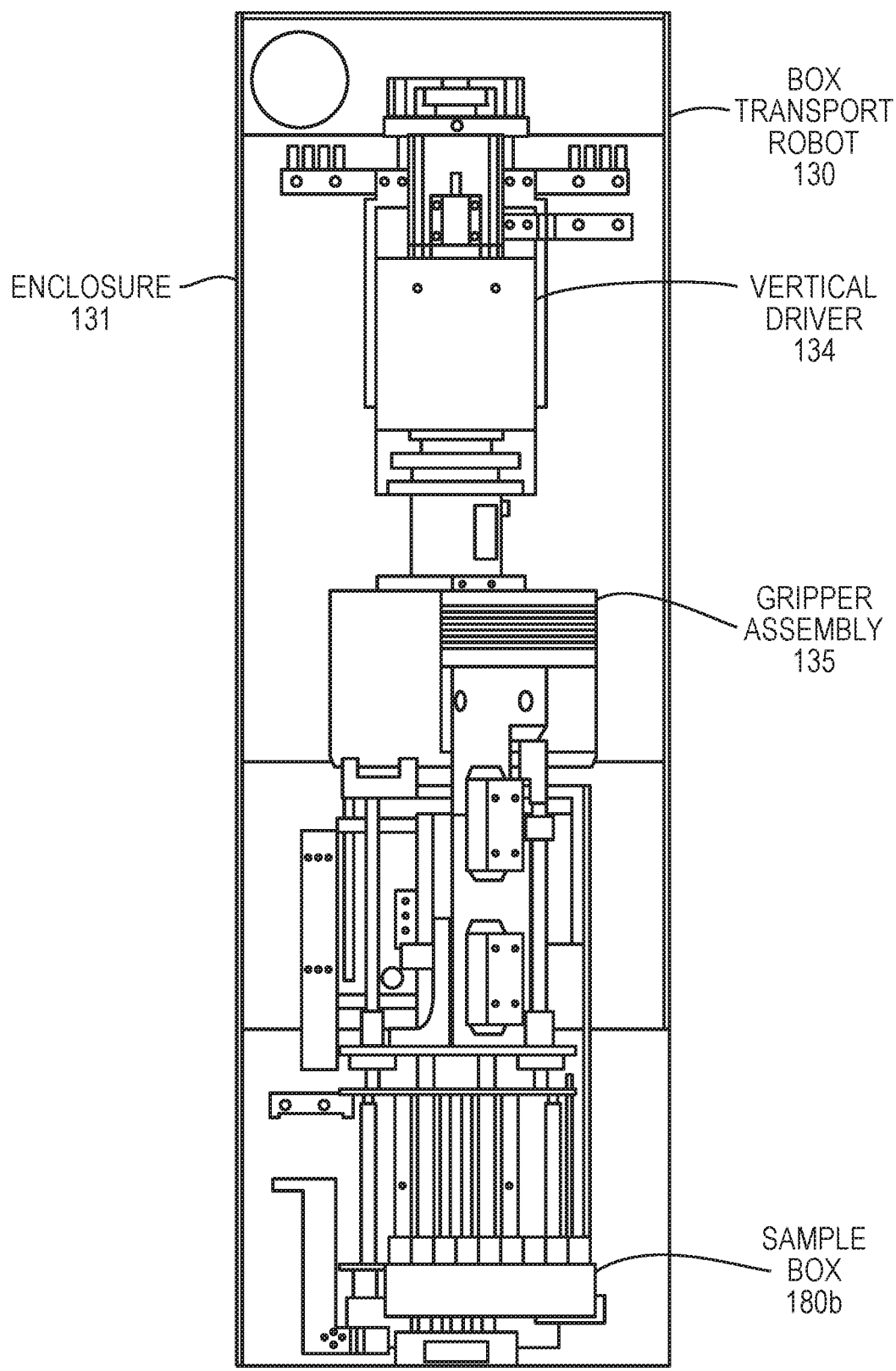

FIG. 4A-B illustrate the box transport robot 130 in further detail. FIG. 4A is a perspective view of the box transport robot 130 within the transport chamber 110. The box transport robot 130 is mounted to an automated rail assembly 132, which provides for lateral movement of the robot 130 along the rails 133*a-b* of the assembly 132. For example, the box transport robot 130 may move in the x direction along the rail 133*a*, and along the y direction along the rail 133*b*, enabling the box transport robot 130 to move to locations above the I/O port 125 and the intermediate chamber 115. The box transport robot 130 may be housed within an enclosure 131 (e.g., a windowed enclosure as shown), and includes a vertical driver 134 and a gripper assembly 135. The vertical driver 134 may include one or more stepper or servo motors and is configured to raise and lower the gripper assembly 135 along a vertical track to a distance sufficient to reach the freezer ports 108*a-b*, the I/O port 125, and the working chamber 120. Alternatively, the vertical driver may include an extendable arm (e.g., a telescoping arm) capable of lowering the gripper assembly as described above. The gripper assembly 135 is configured to engage with sample boxes such as the sample box 180*b* as shown, enabling the box transport robot to transport the sample box 180*b*.

FIG. 4B is a front cross-section of the box transport robot 130. Here, the gripper assembly 135 is engaged with the sample box 180*b* and has raised the sample box 180*b* into the enclosure 131. In doing so, the sample box 180*b* may be protected during transport within the transfer module 101, and the enclosure 131 may also function as a heat shield and convection blocker to reduce the heat absorbed by the sample box 180*a-b* during transport.

FIGS. 5A-B illustrate the gripper assembly 135 in further detail. FIG. 5A is a perspective view, and FIG. 5B is a front view. The gripper assembly 135 includes a pair of gripper arms 138*a-b* that can selectively engage and secure a sample box, such as the sample box 180*a* as shown, by closing toward the center of the sample box 180*a* and contacting opposite corners of the sample box 180*a*. In further embodiments, the gripper assembly 135 may implement one or more additional arms, which may be configured to secure additional corners and/or edges of the sample box 180*a*. A cover 137 can be selectively lowered onto a top surface of the sample box 180*a* once secured by the gripper arms 138*a-b*. When in close proximity to the top of the sample box 180*a-b*, the cover 137 may secure the sample tubes within the sample box 180*a-b*, and may also serve as a heat shield and minimize frost buildup at the sample tubes. A motor assembly 136 controls operation of the gripper arms 138*a-b* and cover 137, and may include a motor configured to drive the gripper arms 138*a-b* inward toward the center of the gripper assembly 135, as well as outward from the center when reversed. Alternatively, the motor assembly 136 may be replaced by a gear assembly that is controlled by a motor set coupled to the gear assembly and located farther from the gripper arms 138*a-b*. As a result, the motors operating the gripper assembly 135 can be further isolated from the working chamber 120, thereby minimizing adverse effects of the cryogenic environment on the motors.

Figure 6A:
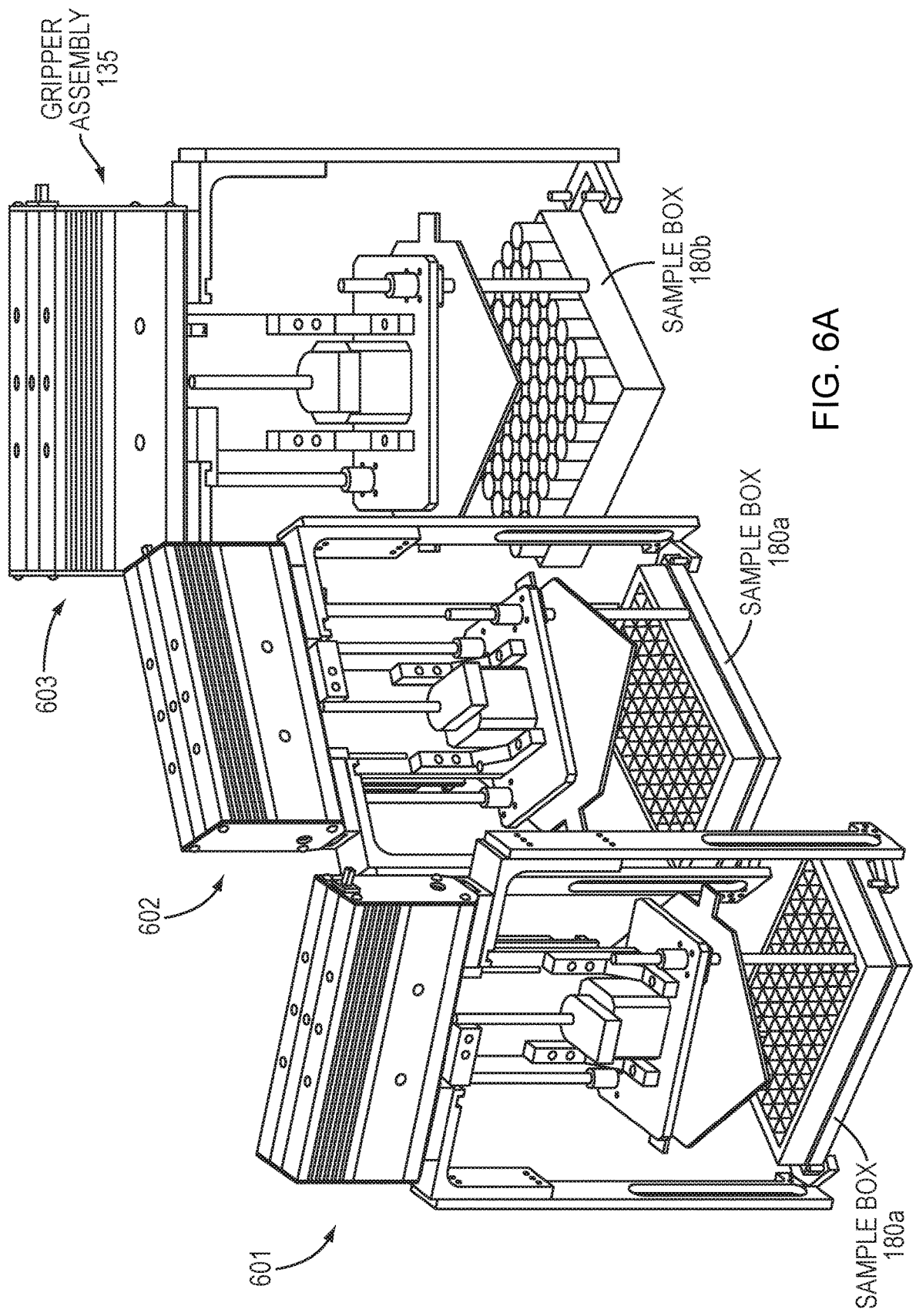
FIGS. 6A-C illustrate the gripper assembly configured to grip a range of different box formats.
Figure 6B:
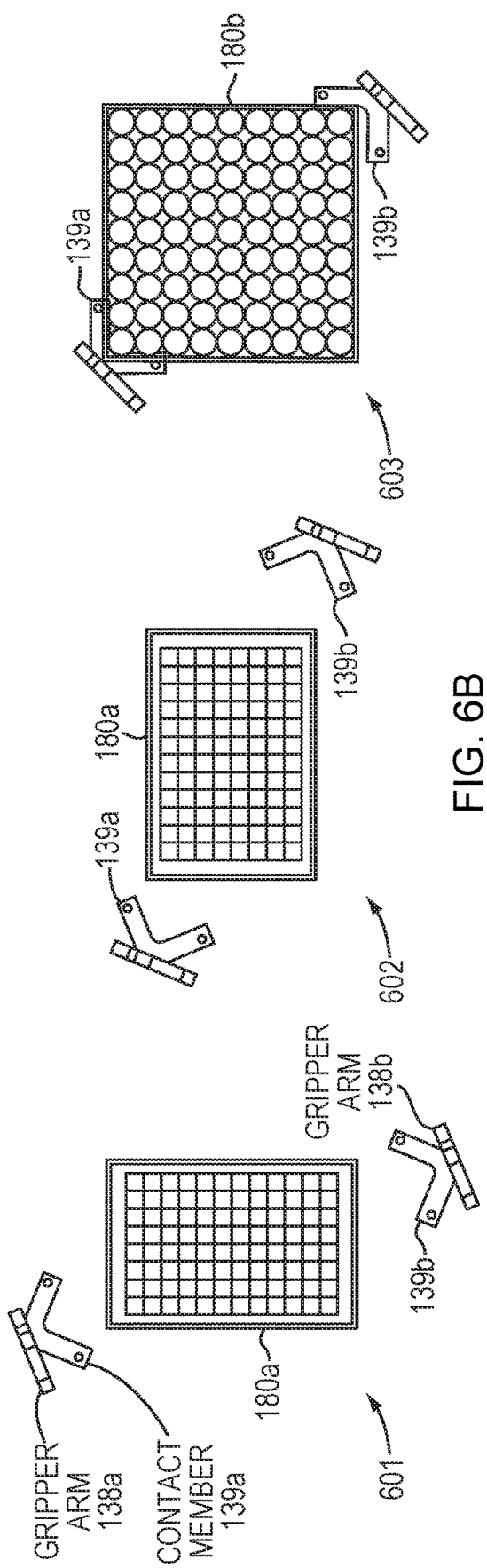
Figure 6C:
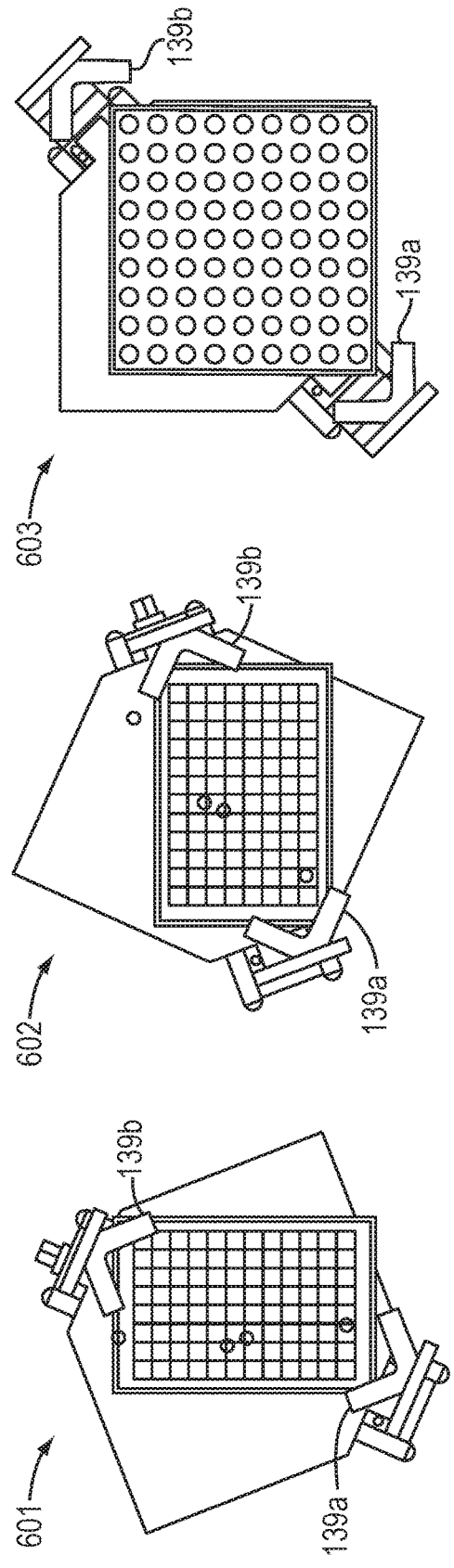

FIGS. 6A-C illustrate the gripper assembly configured to secure a range of different sample box formats and orientations. FIG. 6A is a perspective view of the gripper assembly 135 gripping sample boxes in three different configurations 601, 602, 603. In the first configuration 601, the gripper assembly 135 is configured to engage with the sample box 180*a* (e.g., a rectangular SBS format box). In the second configuration, the gripper assembly 135 is configured to engage with the same sample box 180*a*, but oriented 90° from the first orientation. In the third configuration, the gripper assembly 135 is configured to engage with the sample box 180*b* (e.g., a square Cryobox format box). In order to secure the respective sample box in each configuration (adjusted to a known rotational and positional orientation), the gripper assembly 135 may rotate to a position such that its gripper arms 138*a-b* are both at opposite corners of the sample box and are aligned such that each of gripper arms 138*a-b* can apply a force toward the center of the sample box. As a result of such positioning, the gripper arms 138*a-b* may close in to secure the respective sample box. The pair of gripper arms 138*a-b* may also operate to adjust the sample box to a target rotational and positional orientation. Thus, the gripper assembly 135 may rotate to adjust between the grip positions for different box formats (e.g., SBS and Cryobox), allow the pickup of different orientations of a sample box (e.g., two orientations of an SBS format box), and rotate to allow the barcode reader to read any or all sides of the sample box.

FIG. 6B and FIG. 6C illustrate the configurations 601-603 in top-down and bottom-up views, respectively. Here, in the top-down view of FIG. 6B, the gripper arms 138*a-b* are shown to include respective contact members 139*a-b*. Each of the contact members 139*a-b* may form a pair of arms extending perpendicular to one another, where each arm includes a contact point (e.g., a pin) extending vertically from the arm. When securing the sample boxes 801*a-b*, the gripper arms 138*a-b* may be rotated into position as described above, and then closed in toward the center of the sample boxes 180*a-b*. When the gripper arms 138*a-b* are fully closed in, the contact members 139*a-b* make contact with two adjoining edges of the sample box 180*a-b* via the set of contact points, and each gripper arm 138*a-b* may apply a force toward the center of the sample boxes 180*a-b* sufficient to secure the sample boxes 180*a-b* within the gripper arms 138*a-b*. As shown in FIG. 6C, the contact member 139*a-b* may also extend partially underneath the sample boxes 180*a-b* when contact is made, thereby supporting the sample box 180*a-b* from below to further secure the sample boxes 180*a-b* during transport.

FIGS. 7A-B illustrate an alternative embodiment of the gripper assembly 135, wherein the gripper arms 138*a-b* each include a W-shaped contact member 139*c-d* in place of the contact members 139*a-b* described above. Each W-shaped contact member 139*c-d* may include two (or more) square notches, where each notch is adapted to secure a corner of a sample box in one or more particular formats or orientations. Three configurations 701, 702, 703 may be comparable to the configurations 601-603 described above. However, in order to align the contact member 139*c-d* for contact with a given sample box 180*a-b*, the gripper assembly 135 aligns the gripper arms 138*a-b* to the corners of the sample boxes 180*a-b* to one of the notches of the contact members 139*c-d* before closing in to secure the sample boxes 180*a-b*. For example, in configuration 701, the rightmost notch of contact member 139*c* and the leftmost notch of contact member 139*d* are aligned to contact opposite corners of the sample box 180*a*. In contrast, in configuration 702, the leftmost notch of contact member 139*c* and the rightmost notch of contact member 139*d* are aligned to contact opposite corners of the sample box 180*a* in an orientation rotated 90 degrees. As shown in FIG. 7B, the contact members 139*c-d* may include a lip 730 extending below the sample boxes 180*a-b* when secured.

Figure 8A:
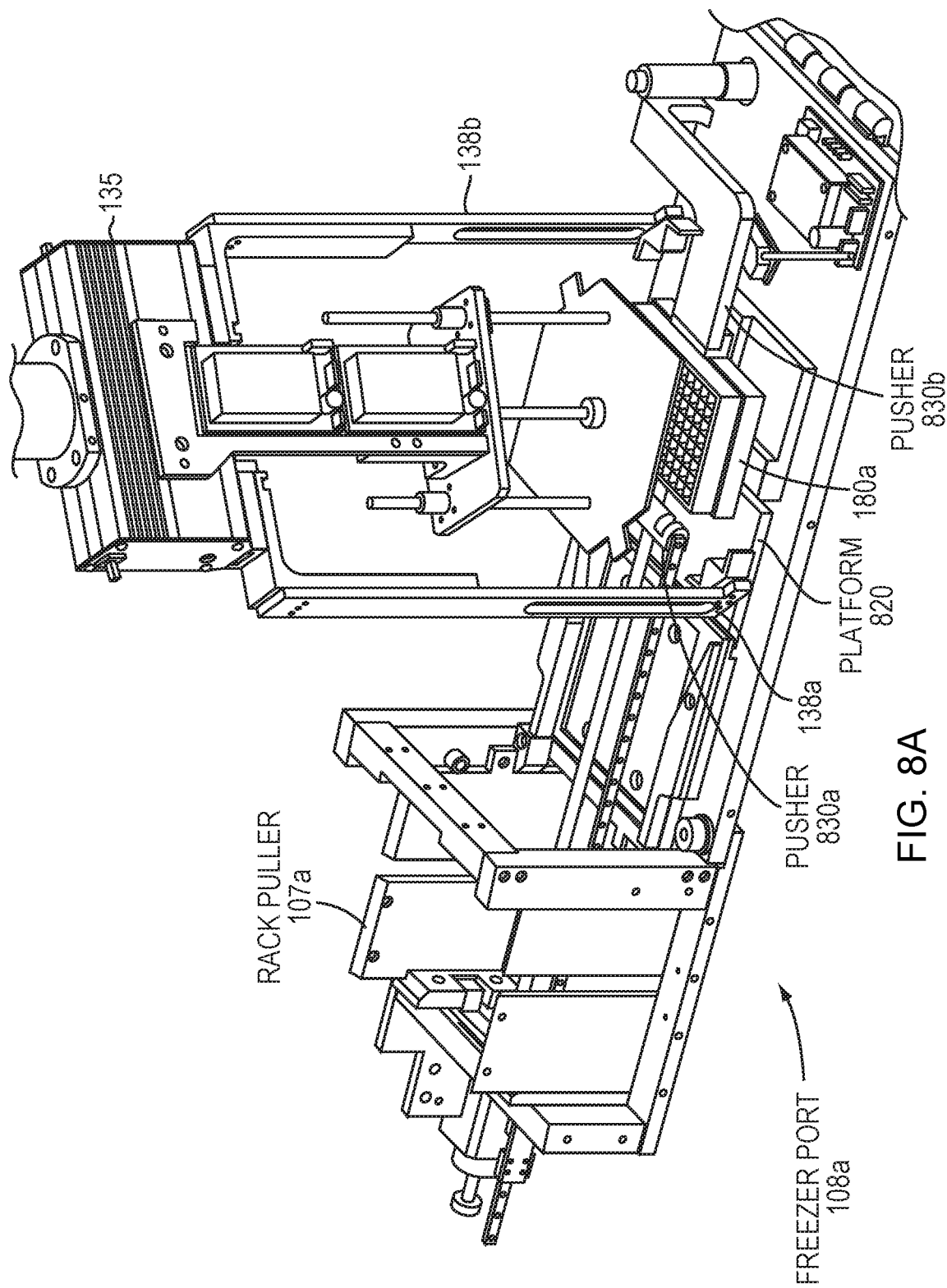
FIGS. 8A-D illustrate a freezer port in one embodiment.

FIGS. 8A-D illustrate the freezer port 108*a* in further detail. FIG. 8A is a perspective view of the freezer port 108*a*, which may connect with the rack puller 107*a* and provide for loading and unloading a sample box (e.g., sample box 180*a* as shown) to and from a storage rack (e.g., storage rack 185) loaded into the rack puller 107*a*. The freezer port 108*a* may also be referred to as an ejector, and includes a pair of pushers 830*a-b*. When ejecting the sample box 180*a* from the rack puller 107*a*, the pair of pushers 830*a-b* may push opposite sides of the sample box 108*a* to keep the sample box 108*a* secure while moving it along a guided passageway to a platform 820. The pusher 830*a* may be located partially at the rack puller 107*a*, and may extend from the rack puller 107*a* into the freezer port 108*a*. Once positioned properly at the platform 820, the sample box 180*a* may be picked up by the box transport robot 130, via the gripper arms 138*a-b*, for transport. When returning a sample box 180*a* to the rack puller 107*a*, the pushers 830*a-b* may push the sample box 180*a* from the platform 820, along the guided passageway, to the rack puller 107*a*. As the sample box 180*a* is pushed, both pushers 830*a-b* may maintain contact with the sample box 180*a* for box stability.

Figure 8B:
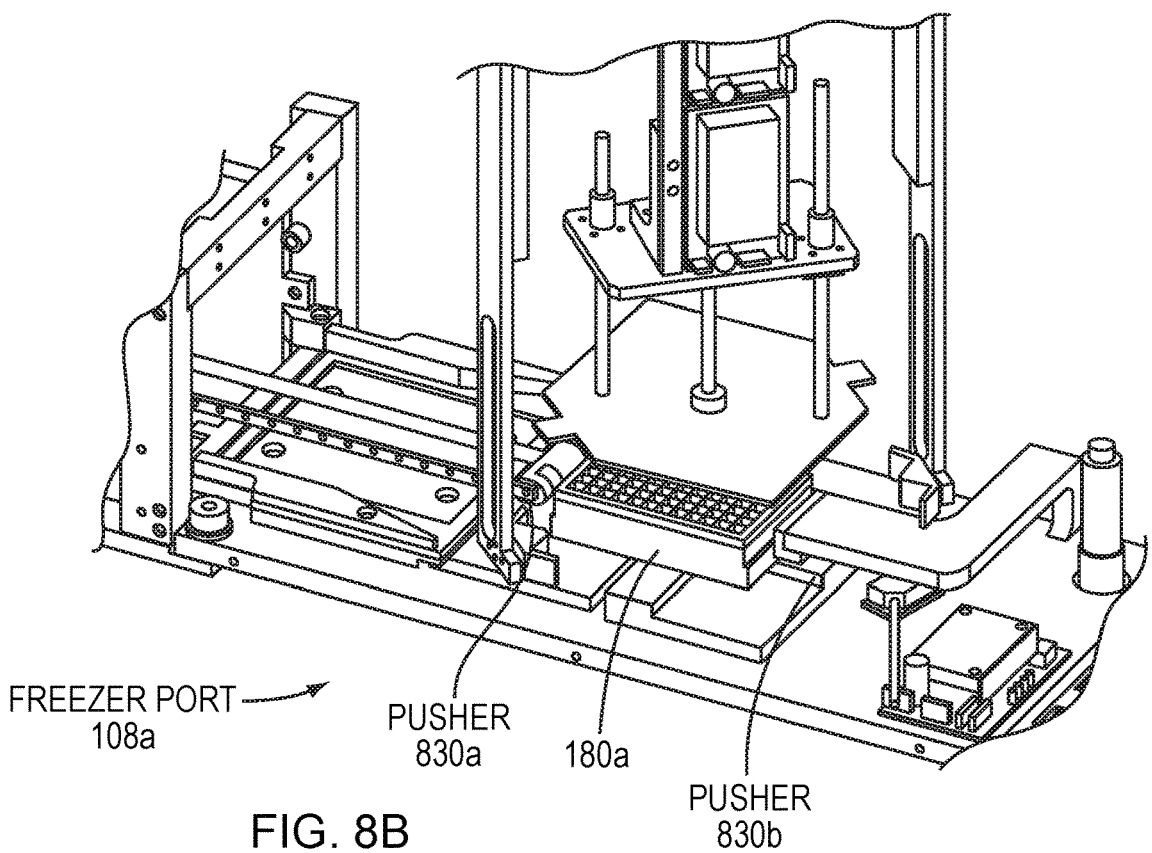
Figure 8C:
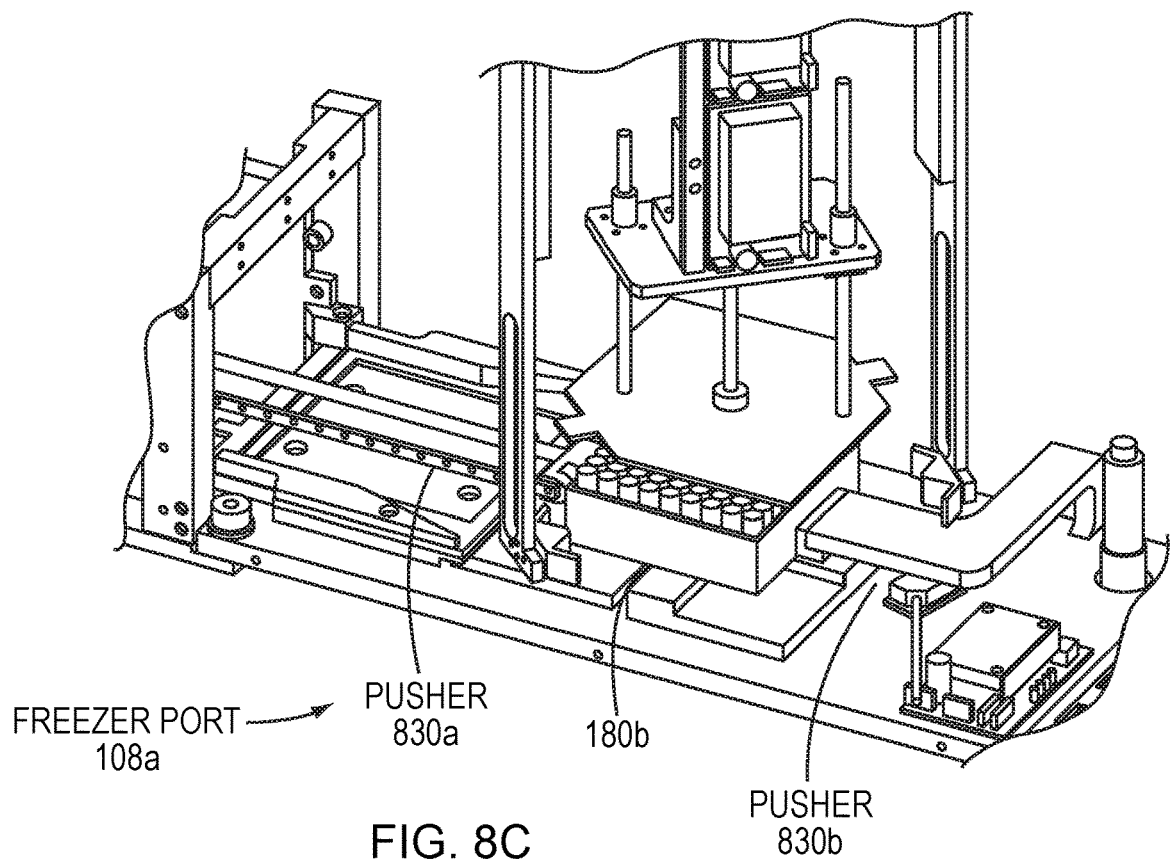

FIGS. 8B and 8C illustrate the freezer port 108*a* in operation of handling sample boxes in further orientations and formats. FIG. 8B shows freezer port 108*a* with the sample box 180*a* in an orientation turned 90° from the orientation shown in FIG. 8A. FIG. 8C shows the freezer port 108*a* with the sample box 180*b*. By applying pushers 830*a-b* at opposite sides of the sample boxes 180*a-b*, the freezer port 108*a* can accommodate a range of different sample box formats and orientations.

Figure 8D:
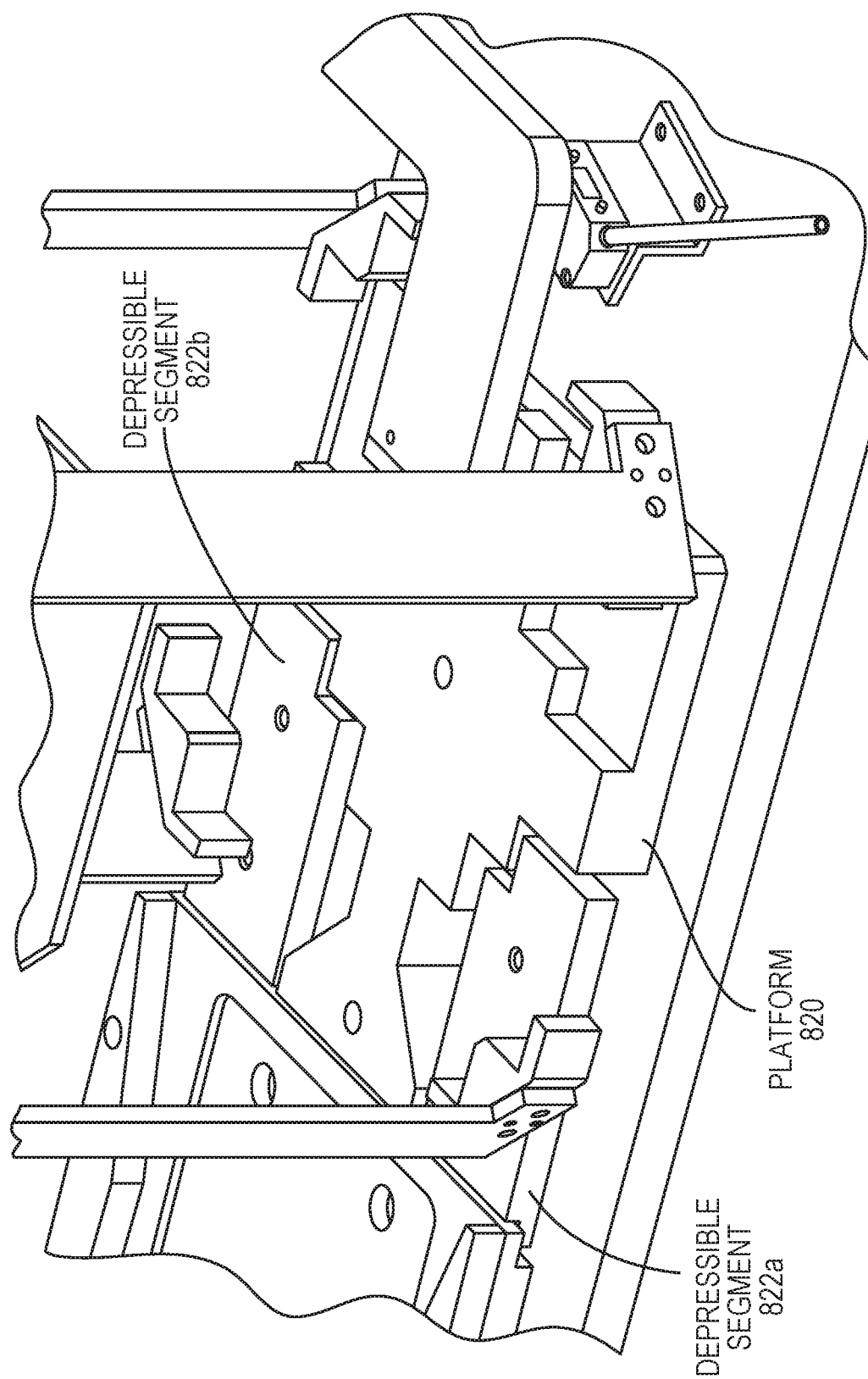

FIG. 8D illustrates the platform 820 in further detail. When gripping a sample box, the box transport robot 130 may position a portion of the gripper arms 138*a-b* partially under the sample box as described above. In order to accommodate this positioning, the platform 820 may include depressible segments 822*a-b*. The depressible segments 822*a-b* may be supported by respective springs such that they support a sample box, but can be lowered by a downward force applied by the gripper arms 138*a-b*.

Figure 9:
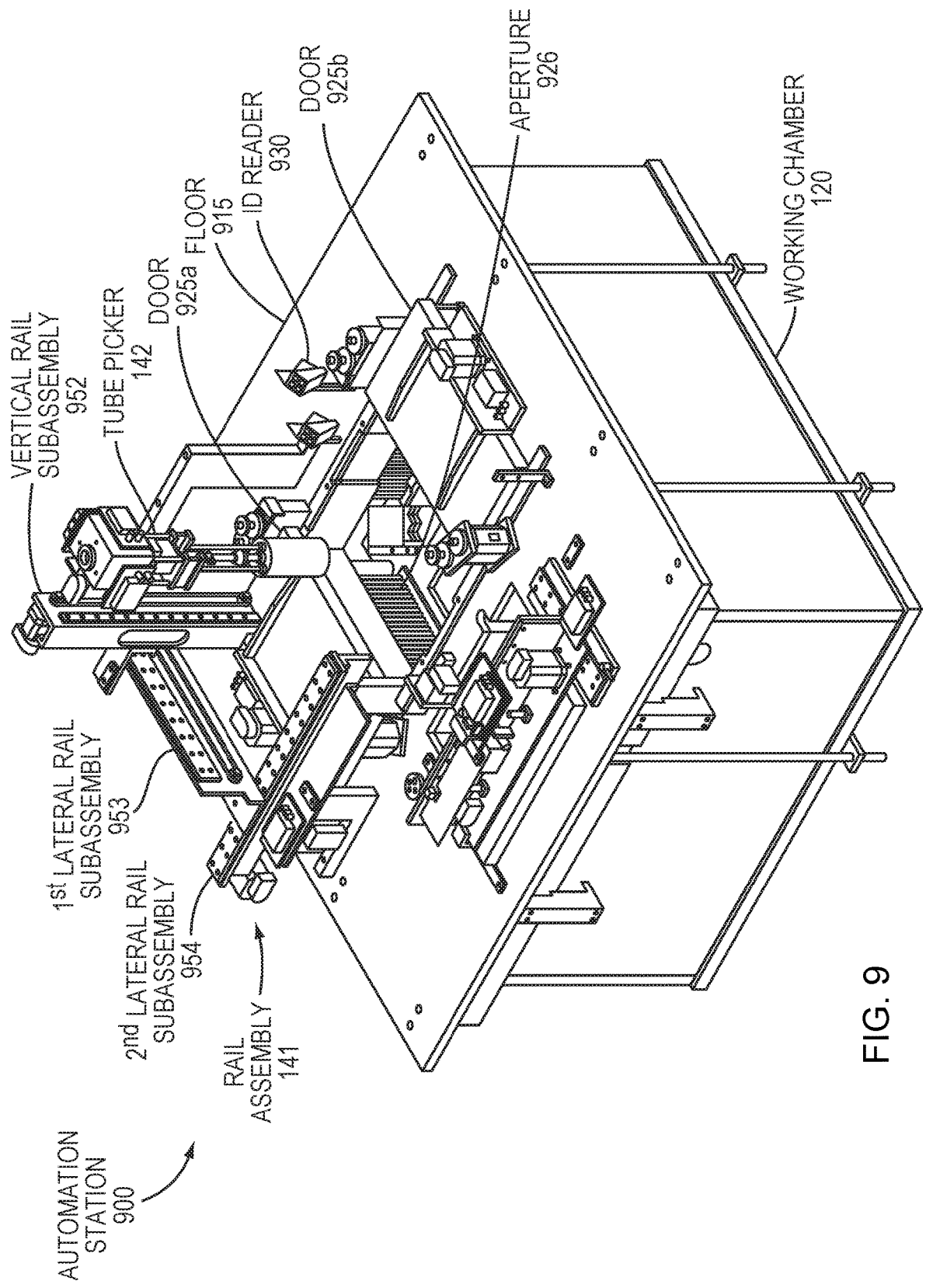
FIG. 9 illustrates an automation station in one embodiment.

FIG. 9 illustrates an automation station 900 in one embodiment. The automation station 900 may be located at a floor 915 occupying a bottom interior surface of the intermediate chamber 115, and is positioned above the working chamber 120. The floor 915 enables passage to the working chamber 120 via an aperture 926, which may be selectively opened and closed via automated doors 925*a-b*. The doors 925*a-b* may remain closed outside of a transfer operation or sample access (e.g., picking, consolidating or tube identification operations), thereby minimizing heat transfer to the working chamber 120 and maintaining the cryogenic environment within it. An ID reader 930 may include one or more scanners (e.g., a barcode reader, a QR code scanner) configured to read a sample ID from a sample tube presented to it.

The picker robot 140 may include a number of components occupying the automation station 900. Specifically, the picker robot 140 may include a tube picker 142 that is mounted to an automated rail assembly 141, which provides for lateral and vertical movement of the tube picker 142. The rail assembly 141 may include three rail subassemblies 952, 953, 954, where each of the subassemblies controls movement of the tube picker 142 in a respective x, y and z direction. In particular, the tube picker 142 may be mounted to a vertical rail subassembly 952 for moving the picker robot in the z direction. The vertical rail subassembly 952, in turn, may be mounted to a first lateral rail subassembly 953 for movement in the x direction. Lastly, the first lateral rail subassembly 953 may be mounted to a second lateral rail subassembly 954 for movement in the y direction. In alternative embodiments, the tube picker 142 may be mounted to a robot arm or other automated mechanism for controlling the movement of the tube picker 142.

Figure 10A:
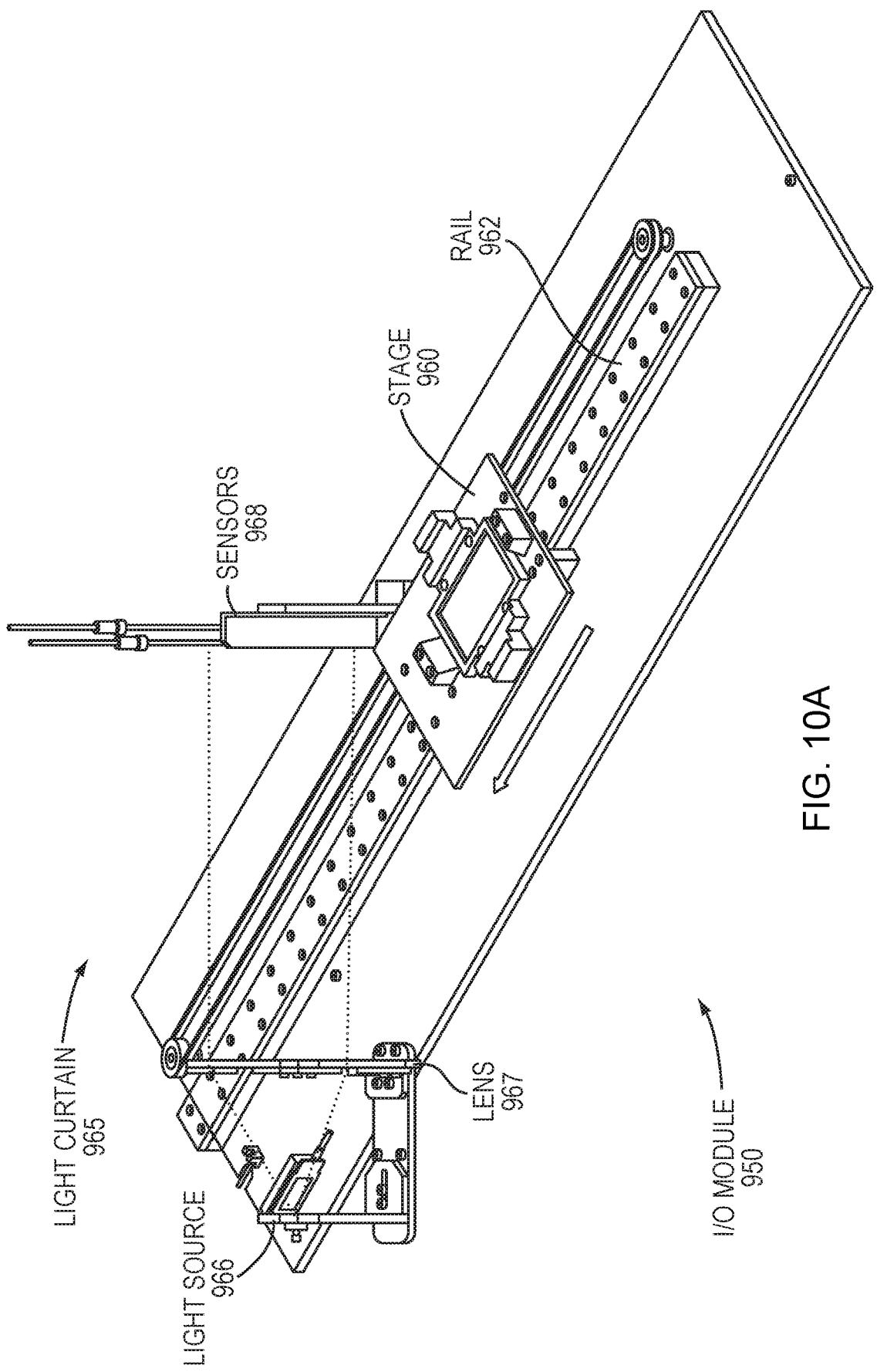

FIGS. 10A-B illustrate an I/O module 950. FIG. 10A is a perspective view, while FIG. 10B is a front view. The I/O module 950 may reside within the I/O port 125 (FIG. 1A), and is configured to scan a received sample box to determine a format and/or orientation of the box. When receiving a sample box at the I/O port 125, a user may place the sample box on a movable stage 960 as it moves along a rail 962 to pass through a light curtain 965. The light curtain 965 may include a light source 966, a lens 967, and light sensors 968. The light source 967 may be a single light source that is collimated by the lens 967 (e.g. a Fresnel lens) to project a collimated light beam across the rail 962 where it may be detected by the sensors 968 (e.g., a set of light sensors arranged in a vertical series). As a result of the light beam being collimated, an object blocking the beam may be detected and measured substantially accurately regardless of distance from the light source 966. The beam of light may also be oriented diagonally to the path of the sample box as shown in FIG. 10A, thereby positioning the light curtain 965 to measure a diagonal length of the sample box as it passes through the light curtain 965. An example light curtain that may be implemented in the I/O module 950 is described in further detail in PCT Application No. PCT/IB2018/050705, the entire teachings of which are incorporated herein by reference.

When the light beam is blocked by the passing sample box, the signal detected by the sensors 968 can be interpreted to determine the height of the labware. For example, the sensors 968 may detect a single sample tube raised above a height threshold for the labware type. In response, the system may be alerted that a sample tube is seated improperly within a sample box, and can take corrective action to reposition the sample tube (e.g., returning the stage 960 to its starting position and alerting the user). A signal detected by the sensors 968 (e.g., a voltage or current over time as a sample box is passed through the light curtain, or a digital signal) may also be interpreted to determine the format and/or orientation of the sample box (e.g., SBS or Cryobox format). Based on the detected format and orientation, the module 101 may command the box transport robot 130 to configure its gripper arms 138a-b to properly engage with the sample box, and the box transport robot 130 may then pick up and transport the sample box from the I/O module 950 to the working chamber 120 or a freezer port 108a-b In further embodiments, the I/O module may also include an ID reader (e.g., a barcode scanner) to read a sample ID of the sample box or sample tubes.

Figure 11A:
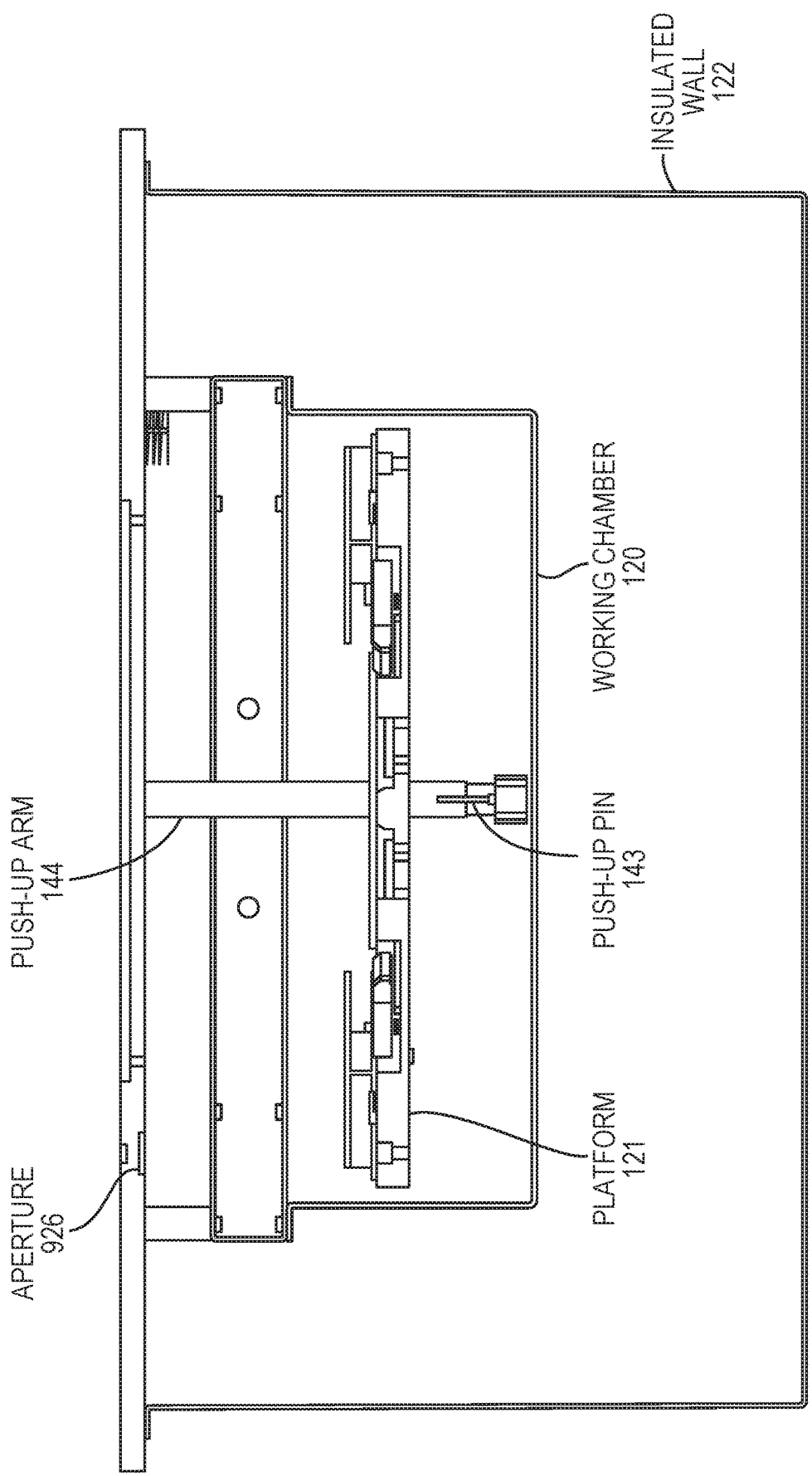
FIGS. 11A-C illustrate a working chamber in one embodiment.
Figure 11B:
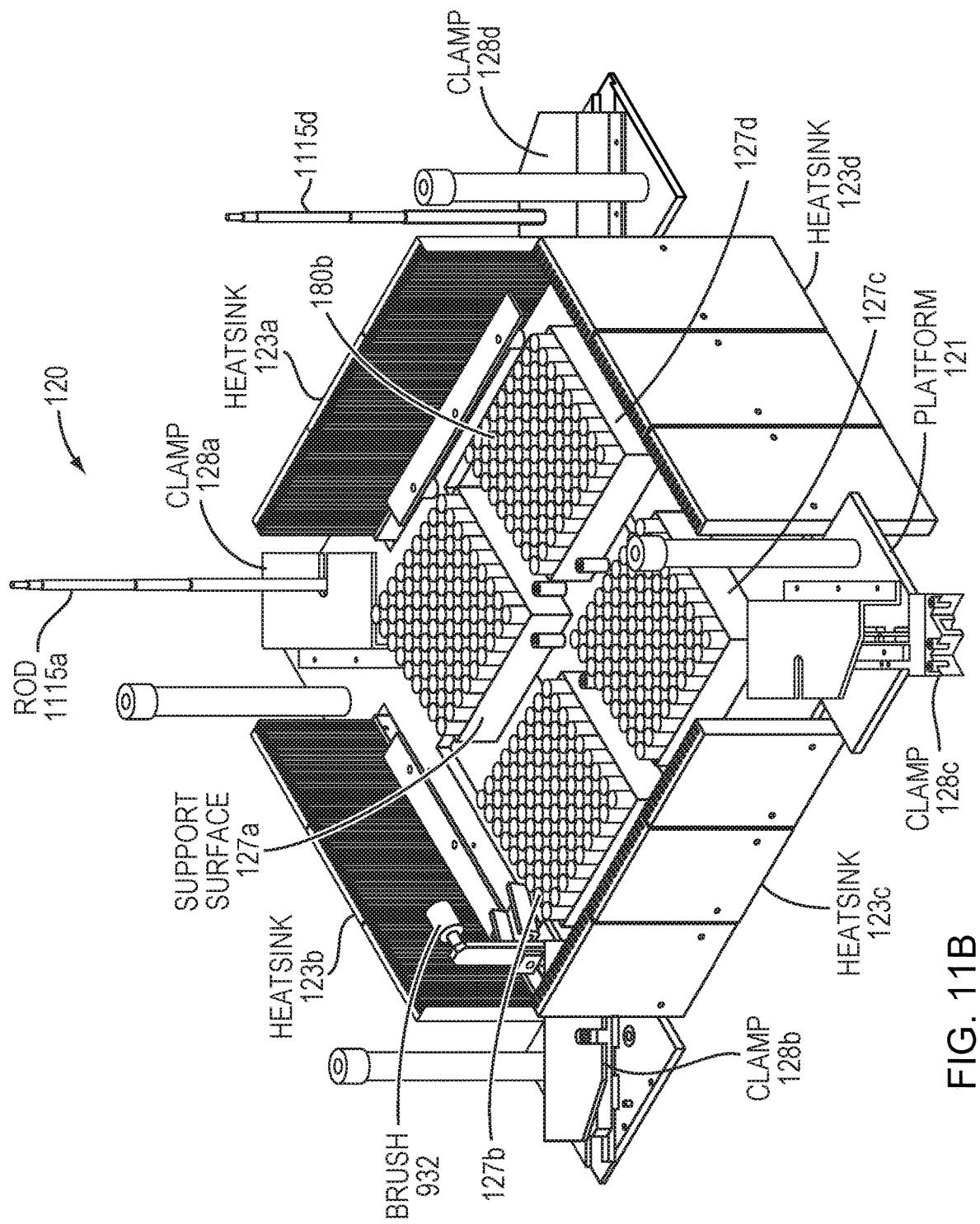
Figure 11C:
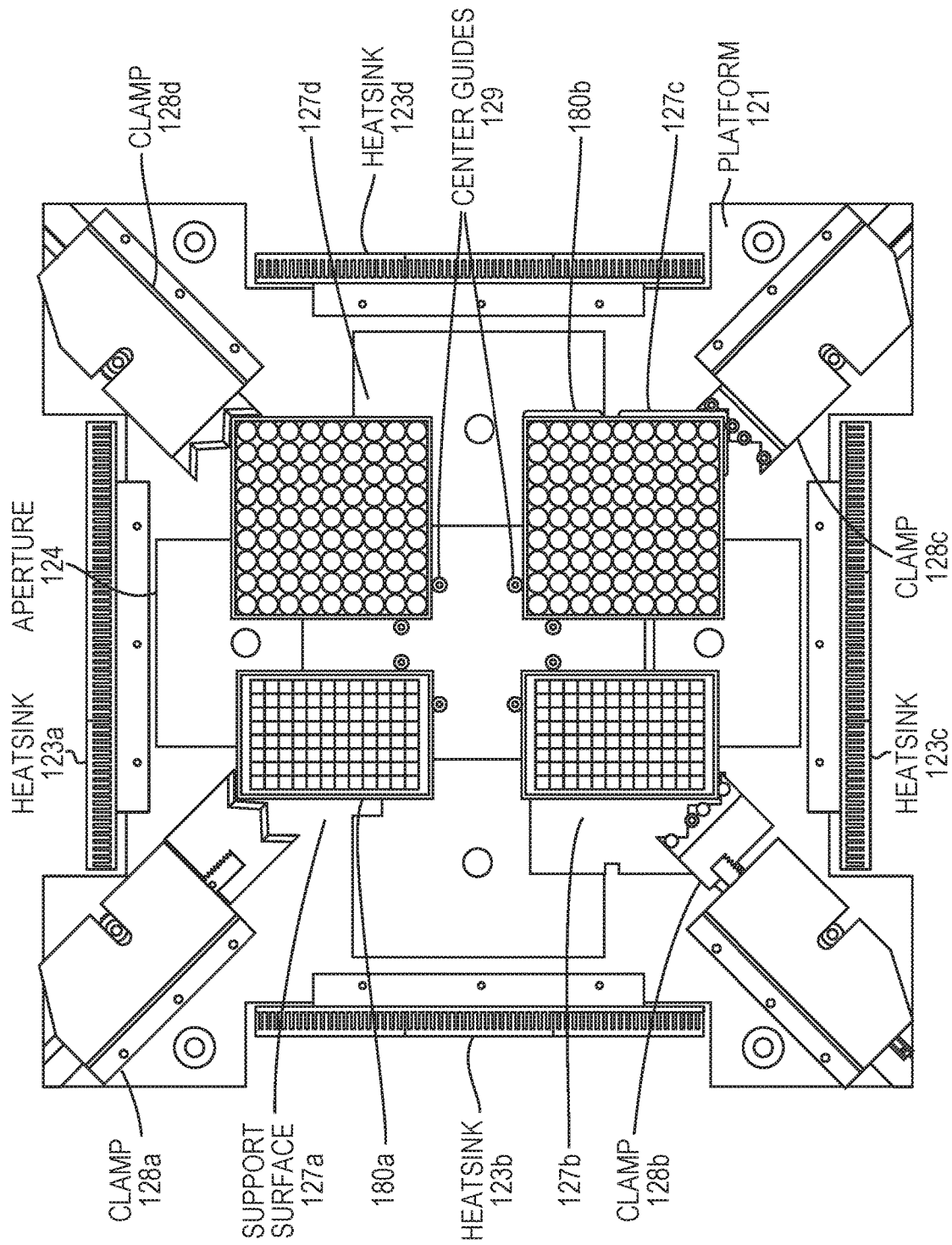

FIGS. 11A-C illustrate the working chamber 120 in further detail. FIG. 11A is a front cross-section of the working chamber 120. The working chamber 120, as described above, is configured to maintain a cryogenic environment, thereby preserving the temperature of the samples within it below a respective glass transition temperature $T_G$ of the samples (e.g., −134 C). To facilitate this environment, an insulated wall 122 encompasses the bottom and sides of the chamber 120, and the top of the chamber 120 may be substantially isolated from the intermediate chamber 115 via the automated doors 925a-b that can cover the aperture 926 when sample boxes are not being transferred into or out of the working chamber 120 and when the samples are not being moved. The working chamber 120 houses a platform 121 that supports multiple sample boxes, which are moved into and out of the working chamber 120 by the box transport robot 130. The working chamber 120 may hold a volume of a liquid coolant (e.g., a cryogenic fluid such as liquid nitrogen) at a portion of the working chamber 120 below the platform 121. A push-up arm 144, terminating in a push-up pin 143, is an extension of the picker robot 140 (described in further detail below), and may be partially immersed in the liquid coolant. In such a configuration, a portion of the push-up arm 144, particularly a vertical shaft portion extending out of the working chamber 120, may be composed of a material and structure to provide a low heat transfer, thereby reducing heat exchange between the liquid coolant and the environment external to the working chamber 120. Alternatively, the working chamber 120 may include a subchamber configured to contain the liquid coolant, or implement an alternative cooling mechanism (e.g., a heat exchanger) to maintain the cryogenic environment.

FIG. 11B is a perspective view of components internal to the working chamber 120. Here, the platform 121 is shown to include a set of support surfaces 127a-d for accepting and securing respective sample boxes. As shown, each of the support surfaces 127a-d is occupied by a sample box of a Cryobox format (e.g., sample box 180b). Clamps 128a-d may each apply a clamping force at a respective support surface 127a-d to secure the sample box in place. Further, heatsinks 123a-d may be coupled to outer edges or underside of the platform 121 and may extend vertically from the platform 121. The heatsinks 123a-d can assist in maintaining the cryogenic environment within the working chamber 120 and particularly the environment above the sample boxes, into which the sample tubes may be raised (by the picker robot 140) for transfer or scanning. The heatsinks 123a-d may also extend below the platform 121, and may be partially immersed in the liquid coolant occupying a volume below the platform 121. A brush 932 is described in further detail below with reference to FIG. 14A.

FIG. 11C is a top-down view of the platform. In contrast to FIG. 11B, support surfaces 127a-b are occupied by sample box in an SBS format (e.g., sample box 180a), while support surfaces 127c-d are occupied by sample boxes in a Cryobox format (e.g., sample box 180b). Sample boxes of either format can be supported at each of the support surfaces 127a-d. Each of the clamps 128a-d may terminate in 2 square notches as shown (e.g., a W shape comparable to the contact members 139c-d described above), where each notch is adapted to secure a corner of a sample box in one or more particular formats or orientations. Thus, when the clamps 128a-d apply a force toward a raised center guide(s) 129, they can make contact with a corner of a respective sample box at one of the notches, thereby securing the box regardless of format or orientation. The clamps 128a-d may be actuated by motors located external to the working chamber 120, which transfer a torque to a rack and pinion of the clamps 128a-d via respective rods 1115a-d.

To enable access to individual sample tubes within the sample boxes, the platform 121 may define one or more apertures, such as aperture 124. The apertures may extend to some or all of the support surfaces 127a-d to expose at least a portion of the bottom surface of a sample box when occupying the support surfaces 127a-d. As a result, the picker robot 140, operating the push-up arm 144 (FIG. 11A) below the platform 121, can insert the push-up pin 143 through the sample box to raise a selected sample tube partially out of the sample box, thereby facilitating access to the sample tube. Some or all of the support surfaces 127a-d may not include apertures that enable access to all sample tubes by the push-up pin 143, due to the need to adequately support the sample box at the platform 121. In such a case, the box transport robot 130 may lift, rotate and replace the sample box to its support surface 127a-d, or may move the sample box to another support surface 127a-d to expose a different portion of the bottom of the sample box to the push-up pin 143.

Figure 12B:
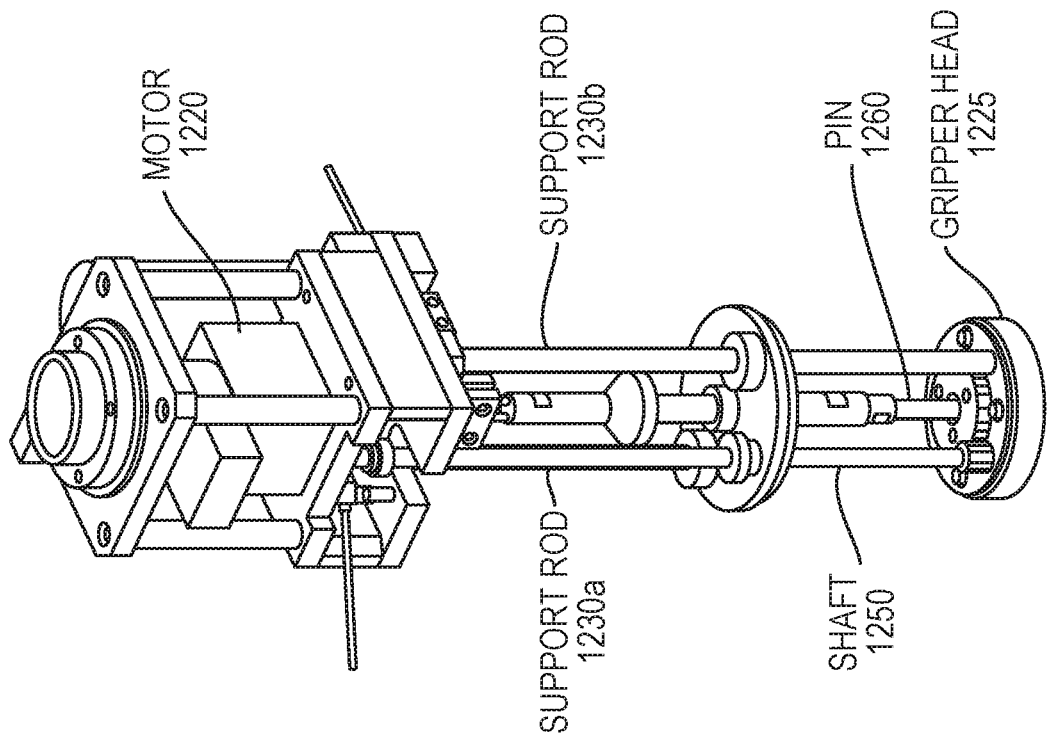
FIGS. 12A-H illustrate a tube picker in one embodiment.
Figure 12A:
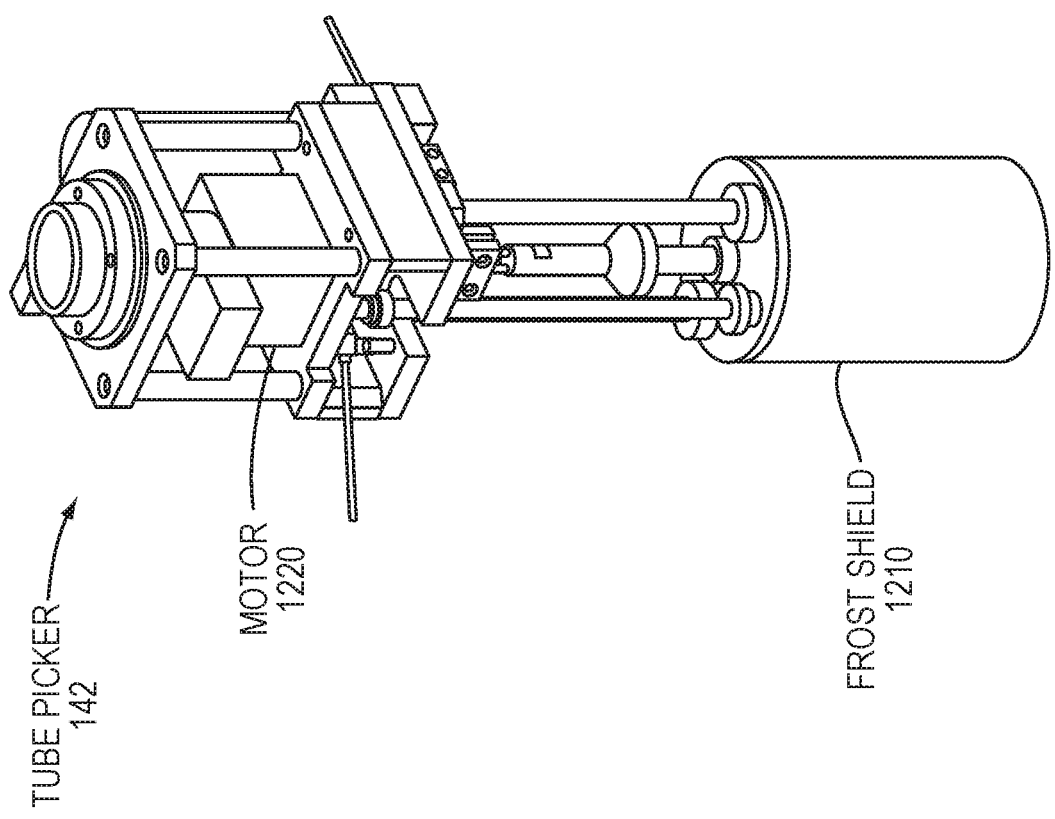

FIGS. 12A-G illustrate a tube picker 142 in further detail. The tube picker may be mounted to the rail assemblies 952-954, described above with reference to FIG. 9, for movement in the x, y and z directions. FIG. 12A is a perspective view of the tube picker 142 including a frost shield 1210. Because the tube picker 142, and particularly the lower portion of the tube picker 142, is periodically lowered into the cryogenic environment of the working chamber 120, it is susceptible to a buildup of frost. The frost shield 1210 covers the lower portion of the tube picker 142 to minimize the buildup of frost on the components housed within.

FIG. 12B is a perspective view of the tube picker 142 absent the frost shield 1210. A motor 1220 operates to actuate a gripper head 1225 at an opposite end of the tube picker 142. Due to the cryogenic environment in which the gripper head 1225 operates, the motor 1220 (and other powered components) may be located remotely from the gripper head 1225 in order to prevent adverse effects on the motor 1220. A pair of support rods 1230a-b may extend between the motor 1220 and the gripper head 1225 to support the assembly. A shaft 1250, powered by the motor 1220, actuates the gripper head 1225.

Figure 12C:
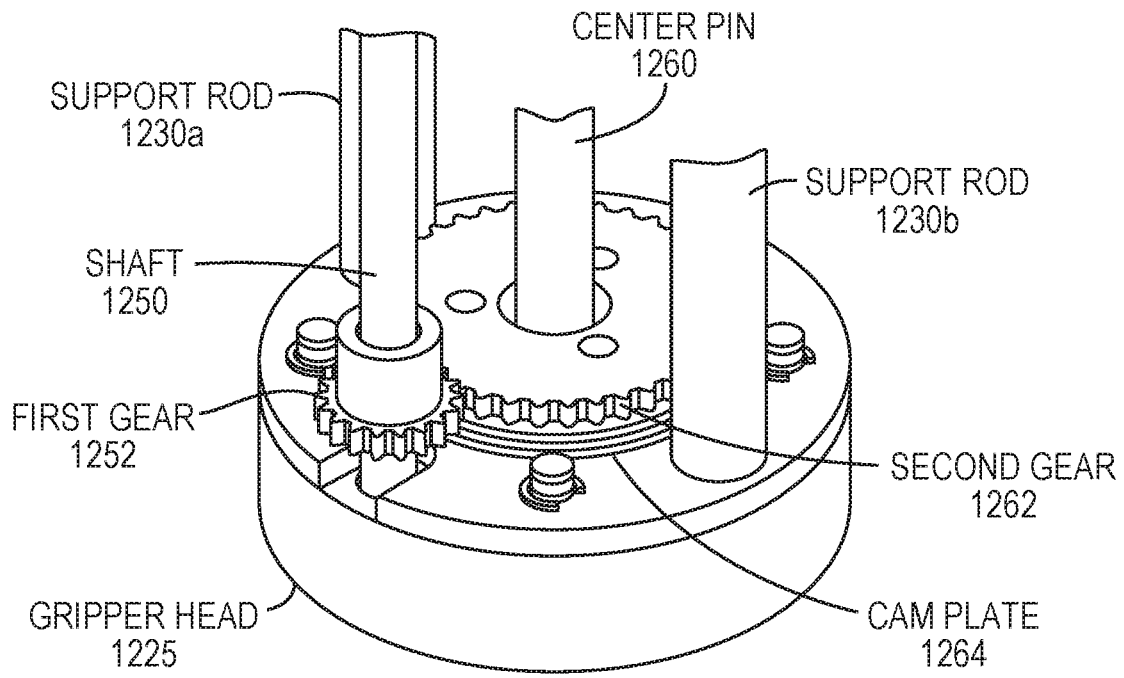
Figure 12D:
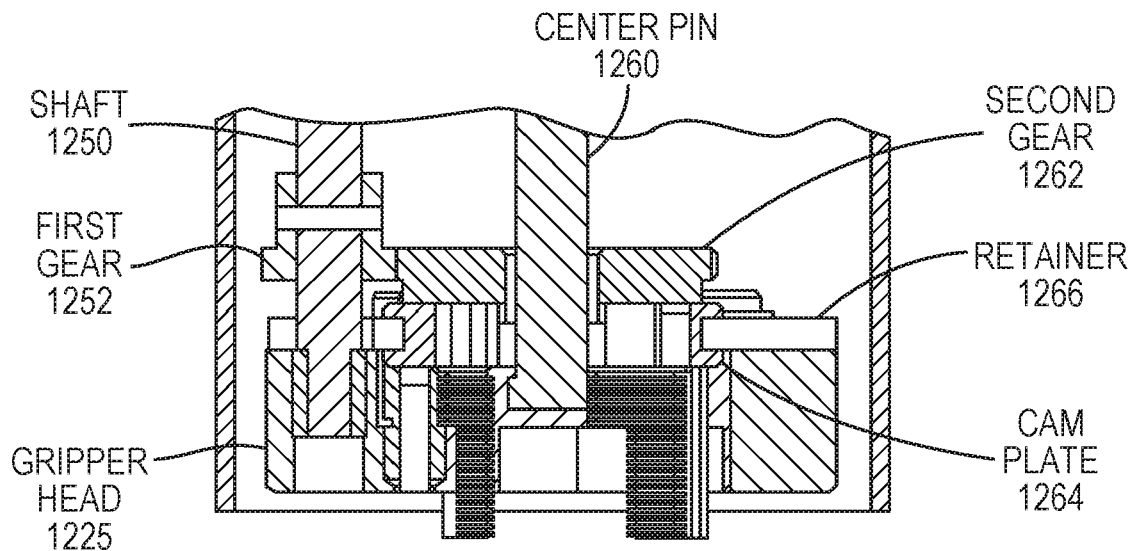

FIGS. 12C and 12D show the gripper head 1225 in a perspective view and a cross-section, respectively. The shaft 1250 connects to a first gear 1252, which meshes with a second gear 1262 that rotates around a center pin 1260. The second gear 1262 is also coupled to a cam plate 1264, which is retained by a retainer 1266.

Figures 12E, 12F, 12G:
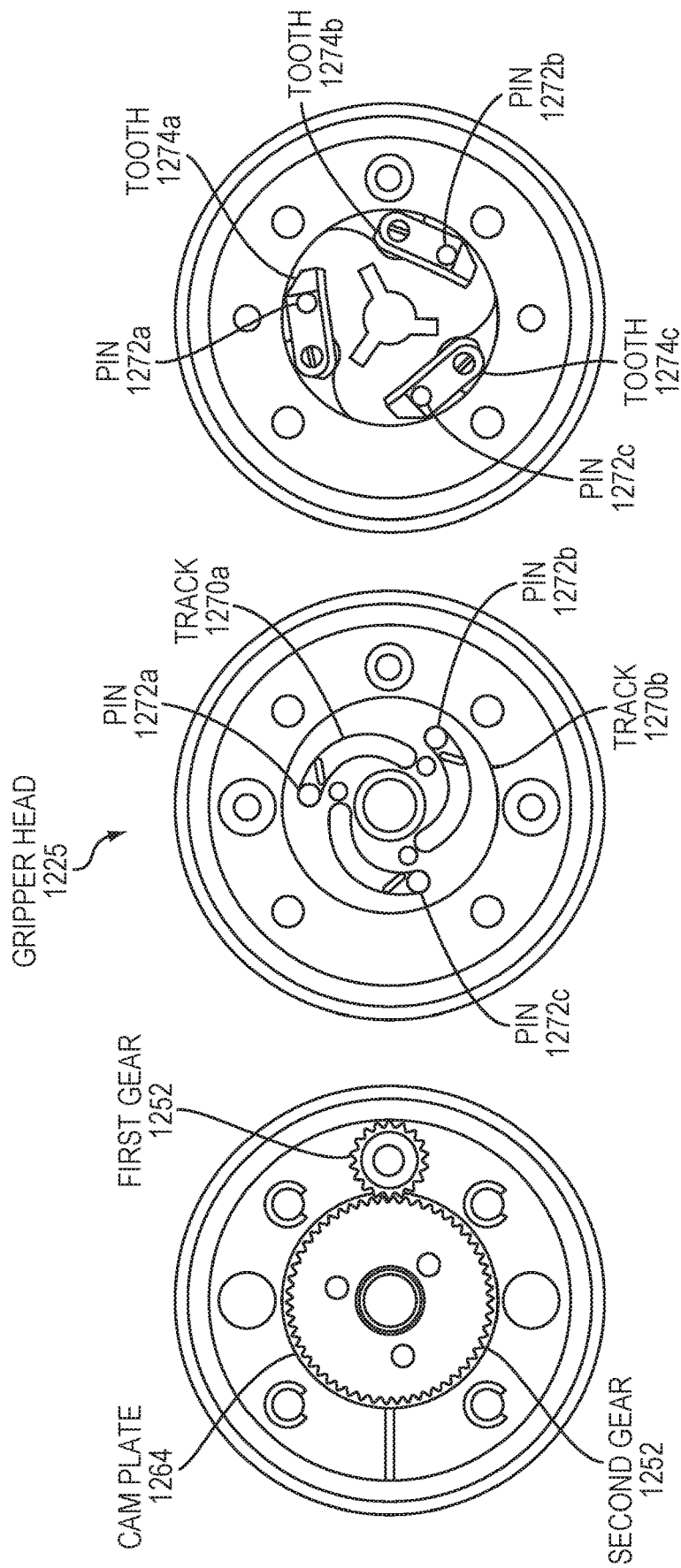

FIGS. 12E-G are cross-sections of a bottom-up view of the gripper head 1225, and are ordered to illustrate operation of the gripper head 1225. At FIG. 12E, the first gear 1252, driven by the motor 1220, rotates the second gear 1262, which also rotates the cam plate 1264. As shown in FIG. 12F, pins 1272a-c, coupled to teeth 1274a-c, move radially along respective tracks 1270a-c as the cam plate 1264 rotates. FIG. 12G shows in further detail the set of gripper teeth 1274a-c (also referred to as tube clamps), which engage with a sample tube (e.g., sample tube 182a). One end of each of the teeth 1274a-c is pinned to a plate of the gripper head 1225, while an opposite end is coupled to a respective one of the pins 1272a-c. Thus, as a result of the pins 1272a-c moving along the respective track 1270a-c, the teeth 1274a-c rotate at one end toward a center of the gripper head 1225 providing a horizontal gripping force, thereby making contact with a sample tube aligned at the gripper head 1225. The gripper head 1225 can be configured to support a variety of sample tube diameters (e.g., by advancing the teeth 1274 a given distance corresponding to a selected tube diameter) without the need for tool changes. Further, the teeth 1274a-c may be thermally isolated (e.g., via an insulating material, such as a gap of air) from the components that bridge into the intermediate chamber, thereby reducing heat transfer to a gripped sample tube.

Figure 12H:
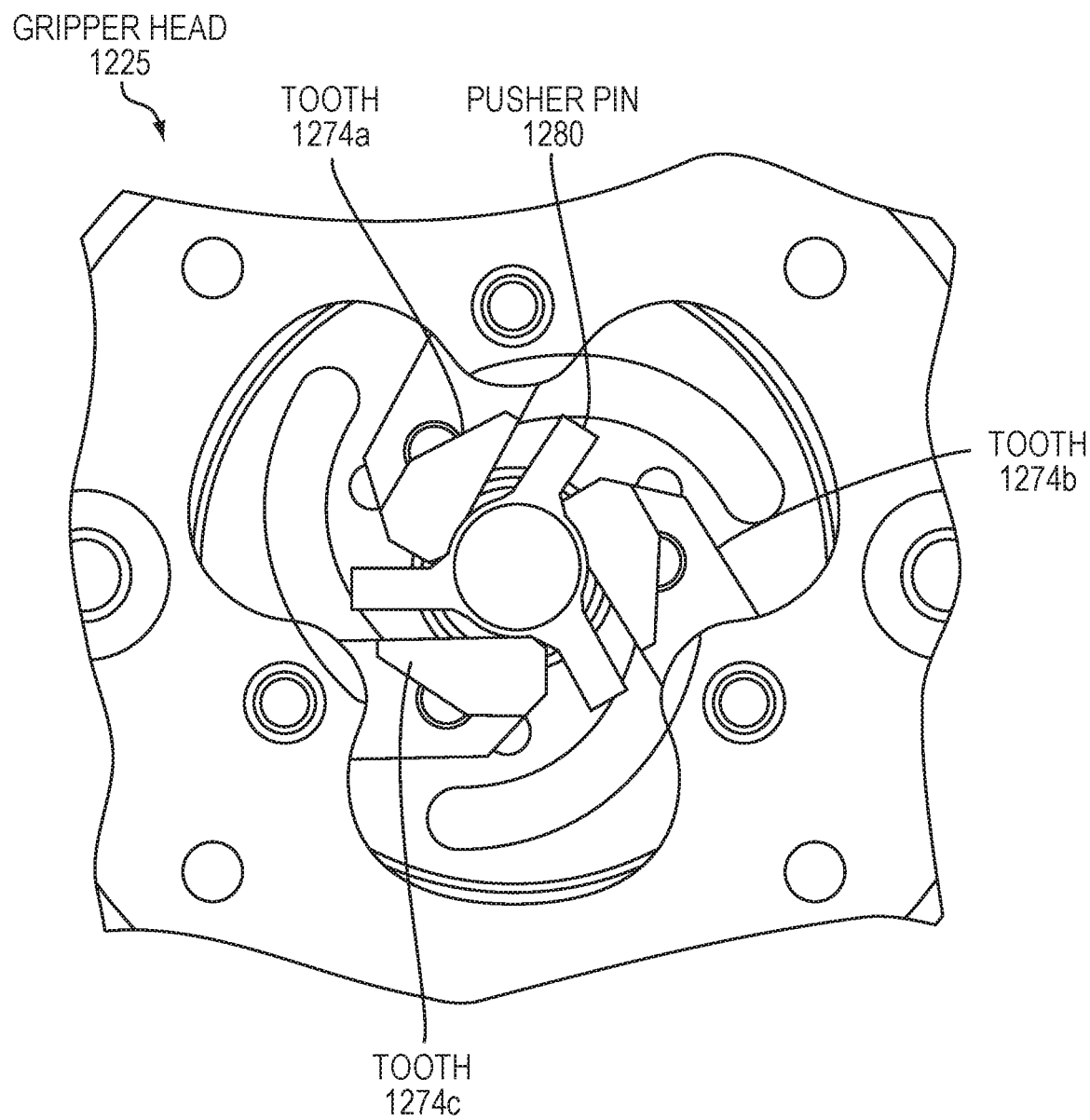

FIG. 12H is a further bottom-up view of the gripper head 1225, illustrating the teeth 1274a-c in a fully engaged state. A pusher pin 1280 may occupy a center of the gripper head 1225 directly above the teeth 1274a-c. The pusher pin 1280 may be actuated by the motor 1220 (e.g., via the center pin 1260), and operates to separate a sample tube from the teeth 1274a-c when disengaging the sample tube. The pusher pin 1280 may be sized, as shown, to pass through the teeth 1274a-c even when fully engaged, and may include fins as shown to facilitate contact with the sample tube. The pusher pin 1280 can assist in placing and positioning a sample tube in a target slot of a sample box, and can also counteract binding between the teeth 1274a-c and the sample tube as a result of frost.

Figure 13:
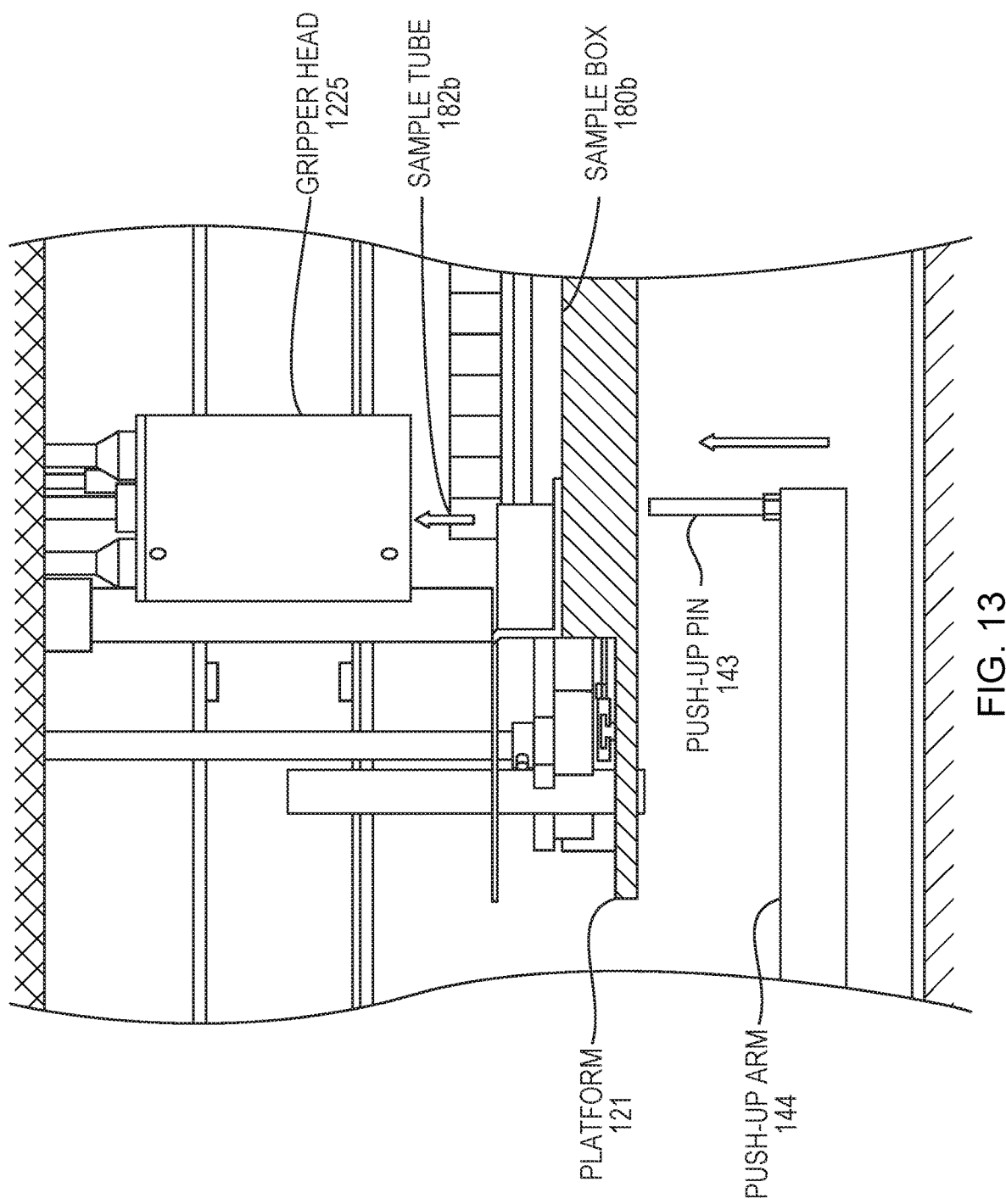
FIG. 13 illustrates a tube extraction operation in one embodiment.

FIG. 13 illustrates a portion of a tube picker robot 140 in an operation of extracting a sample tube 182b from a sample box 180b in the working chamber 120. The gripper head 1225 and push-up pin 143 may first be positioned directly above and below, respectively, the target sample tube 182b. The push-up arm 144, which may be driven by the rail assemblies 953, 954 (FIG. 9) to move laterally in unison with the gripper head 1225, may then raise the push-up pin 143 up through the platform 121 and the sample box 180b, contacting and raising a top portion of the sample tube 182b above the other tubes in the sample box 180b. As a result, the gripper head 1225 has sufficient clearance to engage with the sample tube 182. The gripper head 1225 then grips the top of the sample tube 182b and lifts the sample tube 182b up and out of the sample box 180b.

Figure 14A:
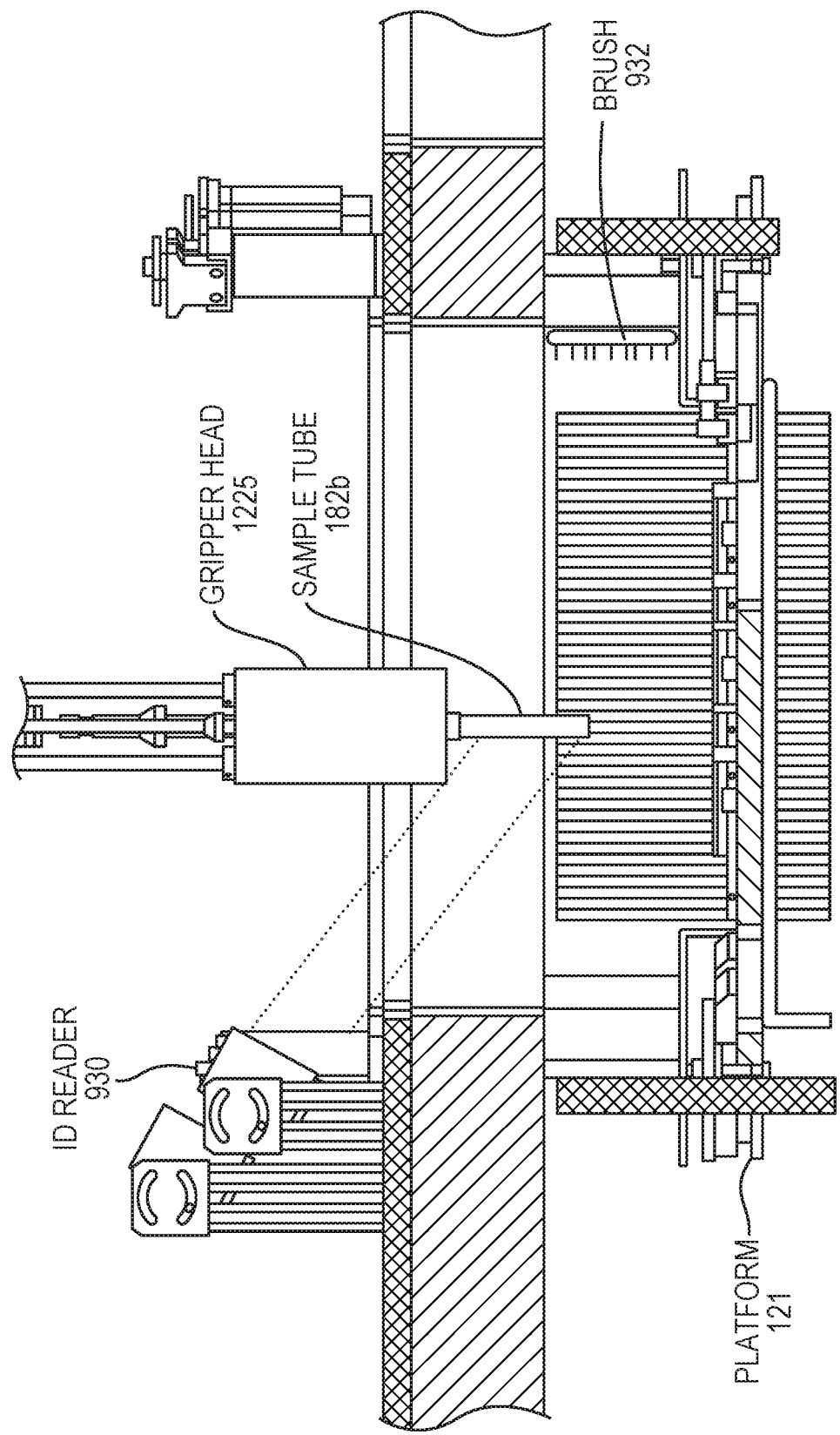
FIG. 14A-B illustrate a sample ID scan operation in one embodiment.
Figure 14B:
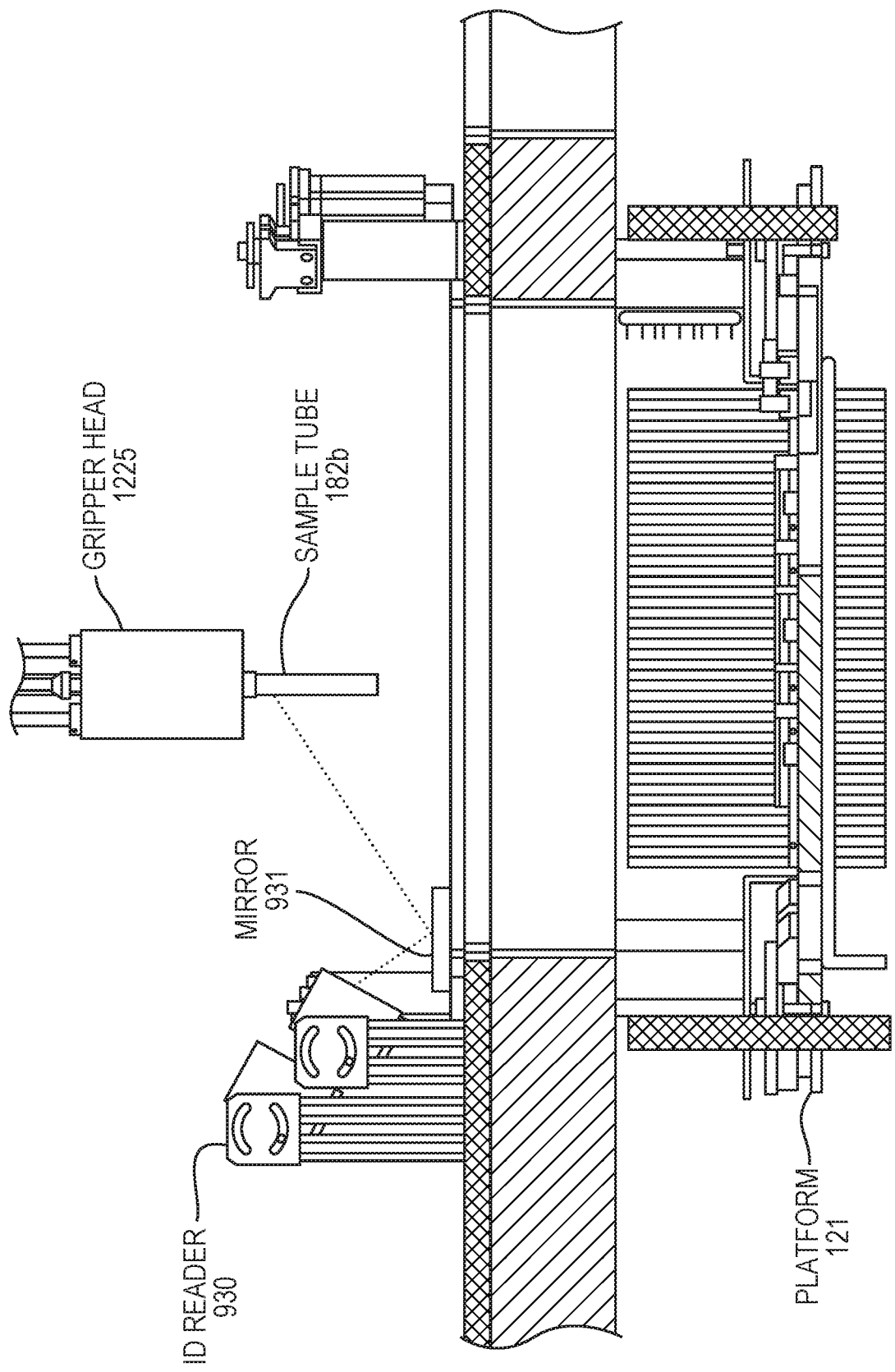

FIGS. 14A-B illustrate a portion of a tube picker robot 140 in an operation scanning a sample ID of a sample tube. The scanning may occur after the extraction operation described above with reference to FIG. 13. FIG. 14A illustrates a scan of a sample ID located at the side of a sample tube 182b. The gripper head 1225 may raise the sample tube 182b partially (or fully) outside of the working chamber 120 and rotate the sample tube 182b to align a portion of the sample tube 182b with a line-of-sight (LOS) of the ID reader 930. If the sample tube 182b has accumulated frost covering the sample ID at the side of the tube, then the gripper head 1225 may first move the sample tube 182b against a brush 932 located inside or outside the working chamber 120 to remove the frost. The ID reader 930 may include a plurality of different readers (e.g., a 1D barcode reader, a 2D barcode reader) in order to scan a range of different sample ID formats. Further, the ID reader 930 may be implemented with one or more optical tools (e.g., mirrors, lenses) to facilitate visibility of the sample ID to the ID reader 930. For example, one or more mirrors may be positioned to reflect an image of the sample ID at the sample tube to the ID reader 930 while the sample tube is located inside the working chamber 120, thereby allowing the sample tube 182b to be identified without exposing it to the non-cryogenic environment outside of the working chamber 120. Following the ID scan, the picker robot 140 may proceed to control the gripper head 1225 to transfer the sample tube 182 to a target slot in a destination sample box.

FIG. 14B illustrates a scan of a sample ID in a further embodiment. In this example, a sample ID is located at the bottom of the sample tube 182b. In order to read the sample ID, a mirror 931 may be positioned in or out of the working chamber 120 and below the ID reader 930 to provide the ID reader with a reflected bottom-up view of the sample tube 180b when raised above the working chamber 120. The gripper head 1225 may raise the sample tube 182b outside of the working chamber 120 to align the bottom of the sample tube with the reflected line-of-sight of the ID reader 930. As a result, the ID reader 930 can scan the sample ID at the bottom of the sample tube 182b.

Figure 15:
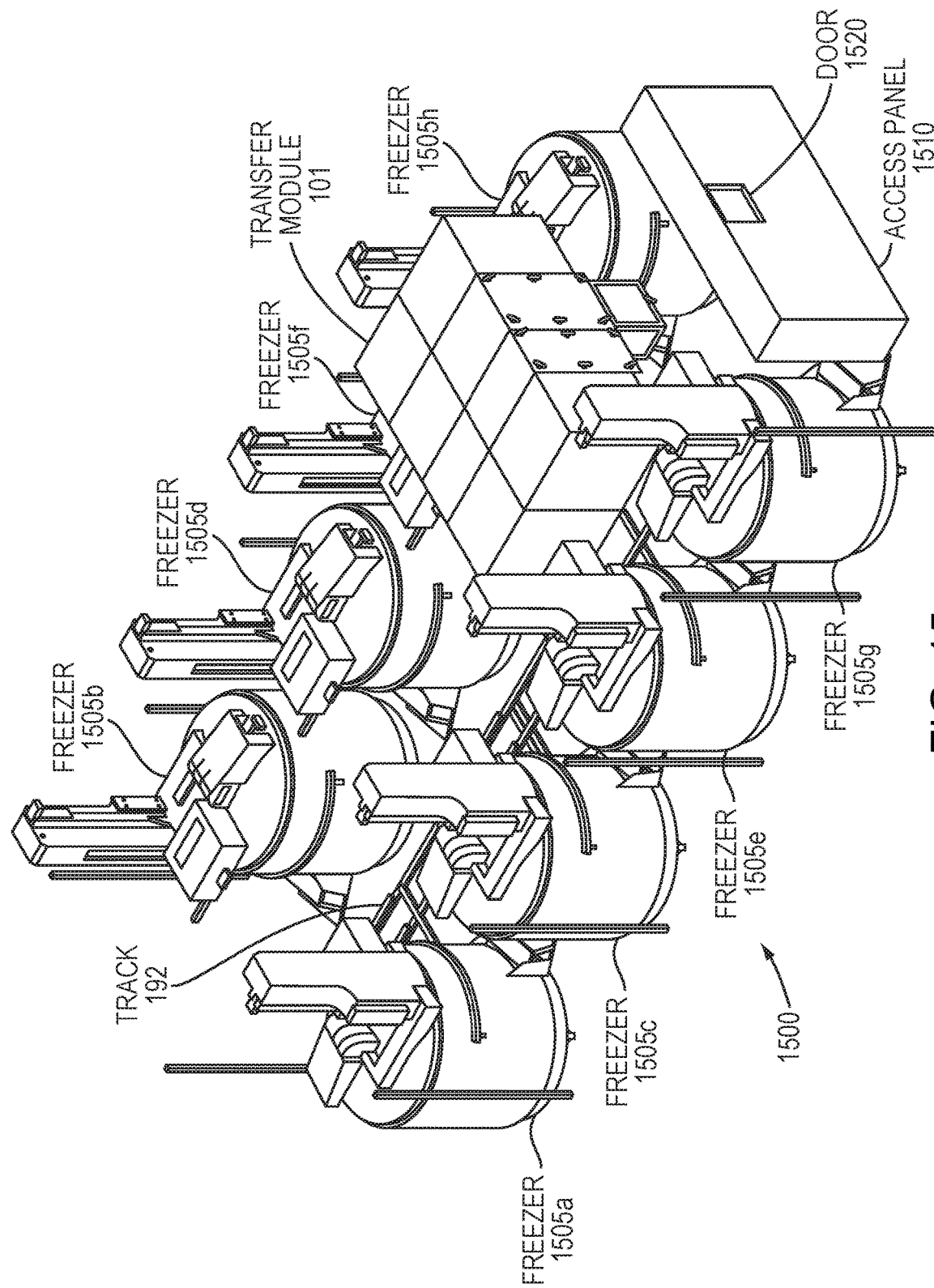
FIG. 15 illustrates a system implementing multiple freezers.

FIG. 15 is a perspective view of a system 1500 including multiple freezers. The system 1500 may include some or all of the features of the system 100 described above, including the transfer module 101 that is configured to move along the track 192. In contrast, the transfer module is configured to service up to two rows each of multiple automated freezers 1505a-h, the rows being aligned at each side of the track 192. Each of the automated freezers 1505a-h may include features of the freezer 105a, the rack puller 107a and, optionally, the freezer port 108a described above. To service a selected one of the automated freezers 1505a-h, the transfer module 101 may move along the track 192 to align its freezer port with either the rack puller or freezer port of the selected freezer.

The system 1500 may also include an access panel 1510 that includes a door 1520. When the transfer module 101 is positioned at the access panel 1510, it I/O port (e.g., I/O port 125) may be aligned with the door 1520, thereby enabling a user to access the I/O port through the door 1520 to add or remove samples at the I/O port. The system 1500 as a whole may be encompassed by adjoining walls (e.g., implemented in a closed room) to ensure user safety during operation.

Figure 16A:
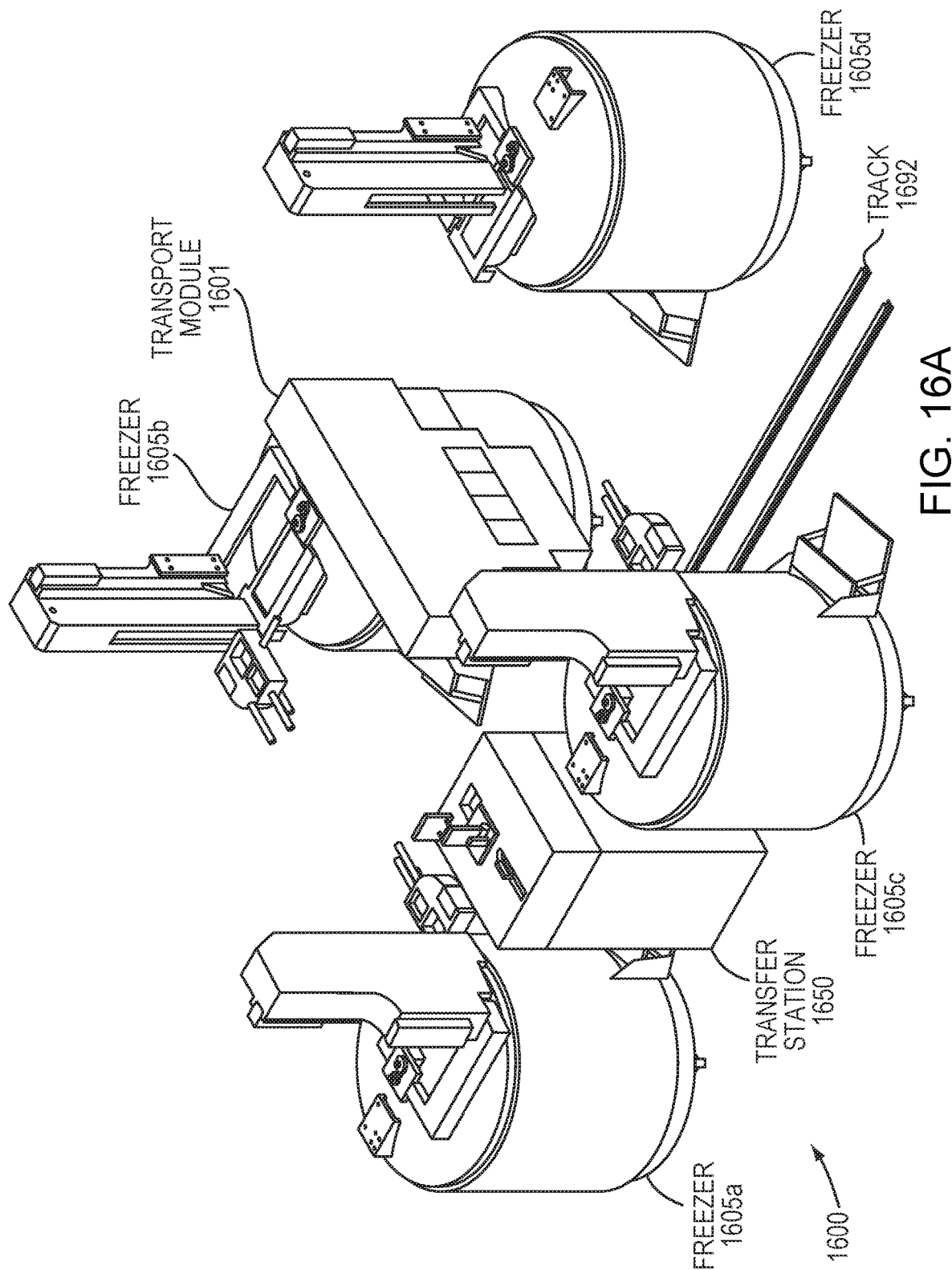
FIGS. 16A-C illustrates a system in a further embodiment.

FIG. 16A illustrates a system 1600 in a further embodiment. The system 1600 may include some or all of the features of the system 100 described above, but in a configuration that maintains a working chamber as a stationary module. The transfer station 1650 may encompass some or all features of the working chamber 120, intermediate chamber 115, automation station 900, ID reader 930, and picker robot 130. The transport module 1601 may encompass some or all features of the transport chamber 110, box transport robot 130, rail assembly 132, I/O port 125, and I/O module 950 described above, and may further include a cache for temporarily storing sample boxes during a transport operation. In further embodiments, the transport module 1601 may also include some or all features of the freezer port 108a described above.

In an example operation, the transport module 1601 may move along a track 1692 to align with a selected automated freezer (e.g., freezer 1605a, which may include the features of the freezer 105a, rack puller 107a and freezer port 108a described above). The transport module 1601 obtains a sample box from the freezer 1605a and stores it to a cache. The transport module 1601 then moves along the track 1692 to align with the transfer station 1650, and transports the selected sample box (and, optionally, other sample boxes) into a working chamber of the transfer station 1650. The transfer station 1650, utilizing a picker robot, may perform a transfer of selected sample tubes between the selected sample box and one or more other sample boxes as described above. Once the sample tube transfer is complete, the transport module 1601 may retrieve the selected sample box and return it to the freezer 1605a, or may transport it to a different freezer, or to a user via an integrated or standalone I/O port.

By maintaining a stationary working chamber, the transfer station may simplify maintenance of the cryogenic environment within it. In addition, the transport module 1601, by omitting some elements of the transfer module 101 described above, may occupy less space and mass than the transfer module 101, thereby simplifying movement and accommodating a compact arrangement of the components of system 1600.

Figure 16B:
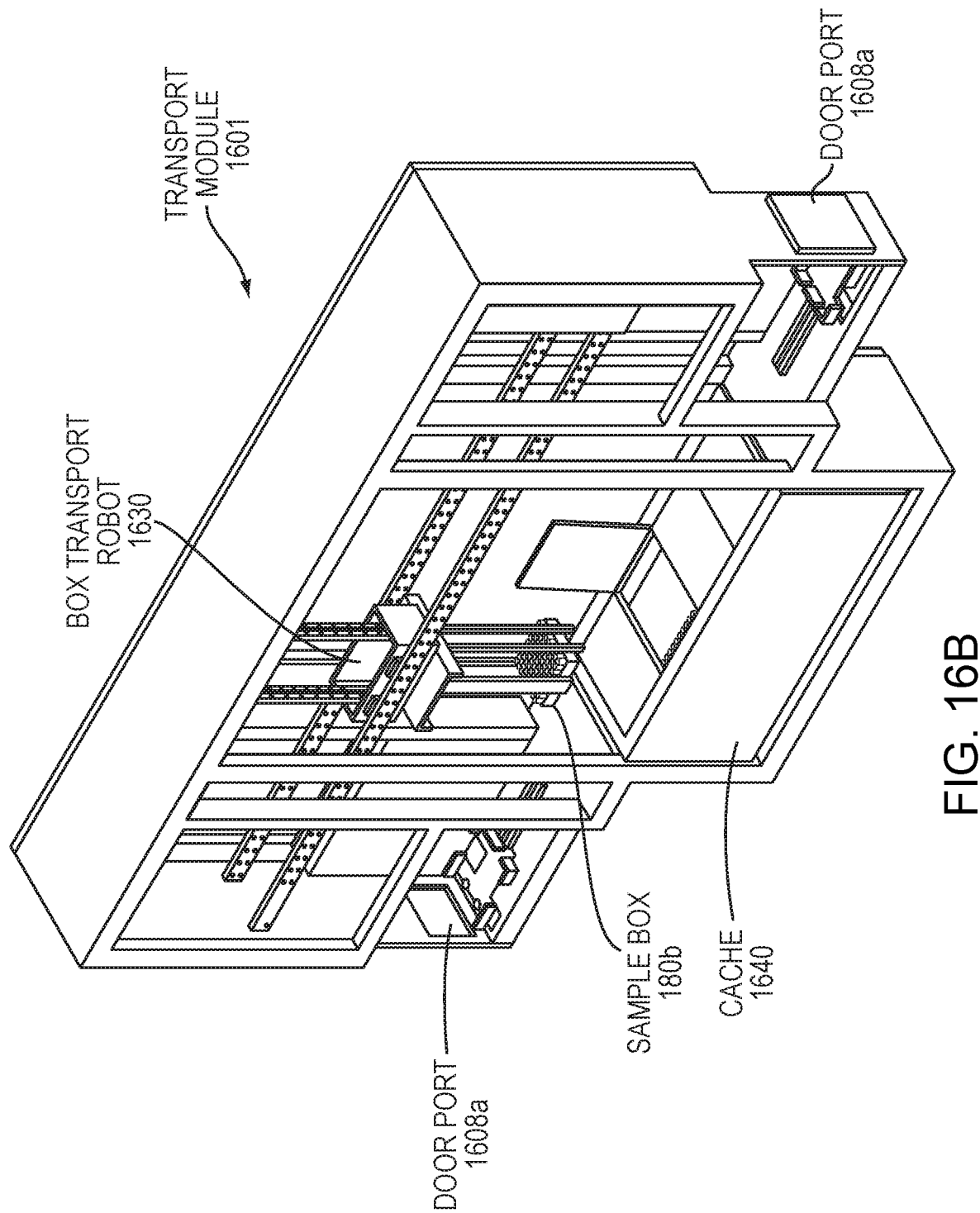

FIG. 16B illustrates the transport module 1601 in further detail, with a front cover removed. The transport module 1601 may include a box transport robot 1630 that may include some or all features of the box transport robot 130 and rail assembly 132 described above. The box transport robot 1630 may operate to transport sample boxes (e.g., sample box 180b as shown) between doors (interfacing with the freezers 1605a-d) 1608a-b and a cache 1640.

Figure 16C:
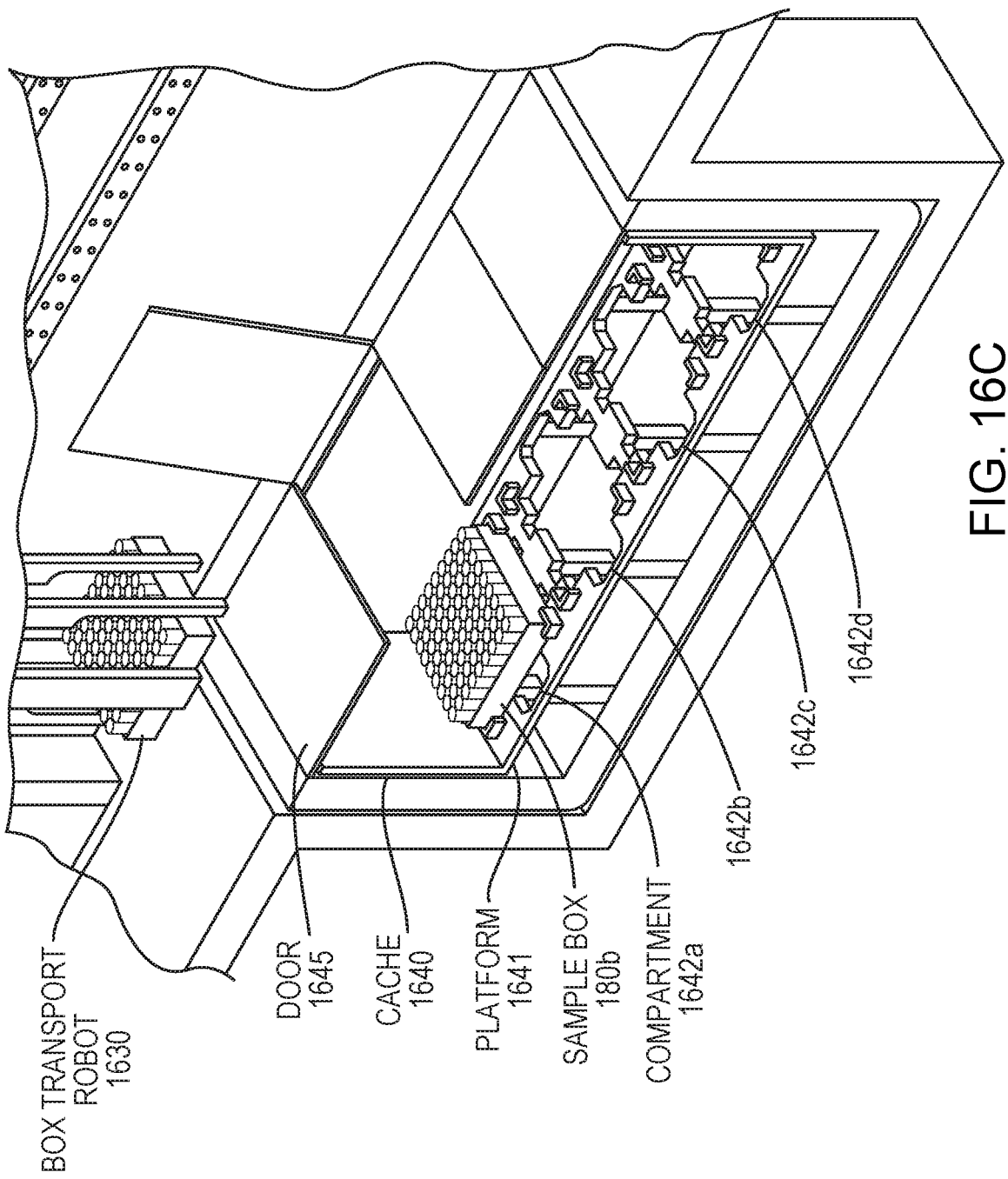

FIG. 16C illustrates the box transport module 1601 and the cache 1640 in further detail. The cache 1640 may include some features of the working chamber 120 described above. For example, the cache 1640 may include a platform 1641 that forms a plurality of support surfaces 1642a-d, each support surface being configured to support a respective sample box such as the sample box 180b as shown at the support surface 1642a. The cache 1640 may also maintain a cryogenic environment, and may do so by containing a volume of a liquid coolant (e.g., liquid nitrogen). Alternatively, the cache may be configured to maintain a temperature above a cryogenic temperature, provided that the samples can be maintained at an acceptable temperature (e.g., below a respective glass transition temperature) for the duration of their time stored at the cache 1640. An automated door 1645 provides passage to the cache 1640, and can be sealed outside of access by the box transport robot 1630 to maintain the environment of the cache 1640.

While example embodiments have been particularly shown and described, it will be understood by those skilled in the art that various changes in form and details may be made therein without departing from the scope of the embodiments encompassed by the appended claims.

What is claimed is:

1. A cryogenic storage system, comprising:
a freezer, the freezer coupled to a freezer port;
the freezer port configured to receive a first sample box extracted from the freezer;
a working chamber configured to maintain a cryogenic environment, wherein the working chamber is configured to enable the selection and transfer of individual sample tubes between sample boxes within the working chamber;
an input/output (I/O) port configured to enable external access to samples;
a box transport robot configured to transport the first sample box between the at least one freezer port, the working chamber, and the I/O port;
a picker robot configured to transport, within the working chamber, a sample tube between the first sample box and a second sample box;
a transport chamber, the transport chamber being coupled to the at least one freezer port during access by the box transport robot, the transport chamber housing the box transport robot; and
an intermediate chamber coupled between the transport chamber and the working chamber, the intermediate chamber housing at least a portion of the picker robot, the box transport robot being configured to transport the first sample box through the intermediate chamber to the working chamber.

2. The system of claim 1, further comprising an ejector configured to transport the first sample box through at least a portion of the at least one freezer port to a position accessible to the box transport robot.

3. The system of claim 2, wherein the ejector includes a pair of arms configured to move and guide opposite sides to control positioning of the first sample box.

4. The system of claim 2, wherein the ejector includes a floor configured to support the first sample box, at least a portion of the floor being depressible via a force applied by the box transport robot.

5. The system of claim 2, wherein the ejector is configured to transport a plurality of different sample box formats.

6. The system of claim 1, wherein the transport chamber is further configured to maintain an environment above a glass transition temperature of samples of the first sample box.

7. The system of claim 1, wherein the transport chamber is connected to the working chamber via an aperture.

8. The system of claim 7, wherein the box transport robot is configured to extend into the working chamber via the aperture during transport of the first sample box.

9. The system of claim 7, wherein the picker robot is configured to extend into the working chamber via the aperture during transport of the sample tube.

10. The system of claim 1, wherein the box transport robot further includes a box gripper assembly configured to grip the first sample box.

11. The system of claim 10, wherein the box gripper assembly includes a pair of arms configured to clamp opposing corners of the first sample box, each of the pair of arms including a set of contact points adapted to accommodate a plurality of sample box formats, the pair of arms being further configured to adjust the first sample box to a target rotational and positional orientation.

12. The system of claim 11, wherein at least one of the sets of contact points define a W shape, a first portion of the W shape accommodates a first sample box format, and a second portion of the W shape accommodates a second sample box format.

13. The system of claim 10, wherein the box transport robot includes a rail assembly on which the box gripper assembly moves.

14. The system of claim 1, wherein the picker robot includes a first arm including a tube gripper assembly and a second arm including a push-up pin.

15. The system of claim 14, wherein the second arm extends under a platform supporting sample boxes in the working chamber, the second arm being configured to drive the push-up pin into the first sample box to raise a portion of the sample tube from the first sample box.

16. The system of claim 14, wherein the tube gripper assembly includes a plurality of teeth, the tube gripper assembly configured to rotate horizontally the plurality of teeth around and toward a center axis to grip the sample tube.

17. The system of claim 16, wherein the teeth are thermally isolated from components of the picker robot external to the working chamber via a thermal insulator.

18. The system of claim 14, wherein the first arm is configured to move the sample tube to a position enabling an identification (ID) tag of the sample tube to be read by an ID reader.

19. The system of claim 18, wherein the position is external to the working chamber.

20. The system of claim 18, wherein the first arm is further configured to 1) pass the sample tube along a cleaner to remove frost from the sample tube and 2) rotate the sample tube to align the ID tag with the ID reader.

21. The system of claim 18, wherein the position enables the ID tag to be read by the ID reader via a reflection of the ID tag from a mirror.

22. The system of claim 1, wherein the working chamber includes a platform configured to support the first and second sample boxes.

23. The system of claim 22, further comprising a clamp assembly configured to secure the first sample box via a force applied to a corner of the first sample box, the clamp including a set of contact points adapted to accommodate a plurality of sample box formats.

24. The system of claim 23, wherein the set of contact points define a W shape, a first portion of the W shape accommodates a first sample box format, and a second portion of the W shape accommodates a second sample box format.

25. The system of claim 22, wherein the platform includes an aperture exposing a portion of a bottom surface of the first sample box, the aperture enabling access to a bottom of the sample tube by the tube picker robot.

26. The system of claim 22, wherein the working chamber is further configured to contain a liquid coolant below the platform.

27. The system of claim 26, further comprising a heat sink coupled to the platform and configured to be partially immersed in the liquid coolant.

28. The system of claim 26, wherein the tube picker robot includes an arm supporting a push-up pin, the arm configured to be at least partially immersed in the liquid coolant.

29. The system of claim 1, further including a light curtain configured to detect a format of a third sample box at the I/O port.

30. The system of claim 29, wherein the light curtain projects a single collimated light source.

31. The system of claim 1, wherein the at least one freezer port includes a plurality of freezer ports, each of the plurality of freezer ports being configured to receive sample boxes extracted from a respective freezer.

32. The system of claim 1, further comprising a rail assembly configured to move the at least one freezer port between a plurality of freezers.

33. The system of claim 32, wherein the rail assembly is further configured to move the working chamber, the box transport robot, and the tube picker robot in unison with the at least one freezer port.

34. The system of claim 1, wherein the at least one freezer port is configured to connect with an extractor assembly, the extractor assembly being configured to raise a storage rack from a freezer and eject the first sample box from the rack.

35. A method of transporting a sample, comprising:
    extracting a first sample box from a respective freezer via a freezer port;
    transporting the first sample box, via a box transport robot, from the freezer port to a transport chamber coupled to the freezer port during access by the box transport robot, the transport chamber housing the box transport robot;
    transporting the first sample box, via the box transport robot, from the transport chamber to an intermediate chamber coupled between the transport chamber and a working chamber configured to maintain a cryogenic environment and configured to enable the selection and transfer of individual sample tubes between sample boxes within the working chamber, the intermediate chamber housing at least a portion of a picker robot;

transporting the first sample box, via the box transport robot, from the intermediate chamber to the working chamber; and transporting, via the picker robot within the working chamber, a sample tube between the first sample box and a second sample box.

36. The method of claim 35, further comprising transporting the first sample box, via the box transport robot, from the working chamber to an I/O port configured to enable external access to samples.

37. The method of claim 35, wherein the working chamber includes a platform configured to support a plurality of sample boxes including the first sample box and the second sample box.

38. The method of claim 37, wherein the working chamber is further configured to contain a liquid coolant below the platform.

39. The method of claim 38, further comprising a heat sink coupled to the platform and configured to be partially immersed in the liquid coolant.

40. The method of claim 38, wherein the tube picker robot includes an arm supporting a push-up pin, the arm configured to be at least partially immersed in the liquid coolant.

41. The method of claim 35, further comprising:
picking the sample tube in the working chamber using the picker robot;
removing frost from the sample tube while the sample tube is at least partially within the cryogenic environment of the working chamber; and
reading the indicia from the sample tube.

* * * * *